United States Patent
Migdal et al.

[11] Patent Number: 5,945,996
[45] Date of Patent: Aug. 31, 1999

[54] SYSTEM AND METHOD FOR RAPIDLY GENERATING AN OPTIMAL MESH MODEL OF A 3D OBJECT OR SURFACE

[75] Inventors: Alexander Migdal; Alexei Lebedev, both of Princeton, N.J.

[73] Assignee: Real-Time Geometry Corporation, Princeton, N.J.

[21] Appl. No.: 08/730,980

[22] Filed: Oct. 16, 1996

[51] Int. Cl.⁶ .................................................. G06T 17/00
[52] U.S. Cl. ............................................................ 345/420
[58] Field of Search .................................... 345/420, 423, 345/419, 433, 425; 364/488, 474.24

[56] References Cited

U.S. PATENT DOCUMENTS

| | | |
|---|---|---|
| 4,845,651 | 7/1989 | Aizawa et al. . |
| 4,888,713 | 12/1989 | Falk . |
| 4,912,644 | 3/1990 | Weiss et al. ............................ 364/577 |
| 4,912,664 | 3/1990 | Weiss et al. . |
| 4,933,889 | 6/1990 | Meshkat et al. . |
| 4,941,114 | 7/1990 | Shigyo et al. . |
| 4,994,989 | 2/1991 | Usami et al. . |
| 5,107,444 | 4/1992 | Wu . |
| 5,125,038 | 6/1992 | Meshkat et al. . |
| 5,189,626 | 2/1993 | Colburn . |
| 5,193,145 | 3/1993 | Akeley . |
| 5,214,752 | 5/1993 | Meshkat et al. . |
| 5,255,352 | 10/1993 | Falk . |
| 5,257,346 | 10/1993 | Hanson . |
| 5,303,386 | 4/1994 | Fiasconaro . |
| 5,345,490 | 9/1994 | Finnigan et al. . |
| 5,367,615 | 11/1994 | Economy et al. . |
| 5,377,011 | 12/1994 | Koch . |
| 5,379,371 | 1/1995 | Usami et al. . |
| 5,398,307 | 3/1995 | Arakawa . |
| 5,410,644 | 4/1995 | Thier et al. . |
| 5,412,762 | 5/1995 | Kondo . |
| 5,440,674 | 8/1995 | Park . |
| 5,448,686 | 9/1995 | Borrel et al. . |
| 5,448,687 | 9/1995 | Hoogerhyde et al. . |
| 5,465,323 | 11/1995 | Mallet . |
| 5,475,799 | 12/1995 | Yoshioka et al. . |
| 5,488,692 | 1/1996 | Karasick et al. . |
| 5,497,451 | 3/1996 | Holmes ...................................... 395/120 |
| 5,522,019 | 5/1996 | Bala et al. . |
| 5,553,206 | 9/1996 | Meshkat . |
| 5,561,749 | 10/1996 | Schroeder . |
| 5,563,995 | 10/1996 | Shirouzu . |
| 5,579,454 | 11/1996 | Billyard et al. . |
| 5,581,673 | 12/1996 | Kikuchi . |

(List continued on next page.)

FOREIGN PATENT DOCUMENTS

WO 96/06325  2/1996  WIPO .

OTHER PUBLICATIONS

Hoppe, Hugues, "Surface Reconstruction from Unorganized Points", PhD thesis, Department of Computer Science and Engineering, University of Washington, Jun. 1994 (TR 94–06–01).

(List continued on next page.)

*Primary Examiner*—Joseph H. Feild
*Assistant Examiner*—Alford W. Kindred
*Attorney, Agent, or Firm*—Kenyon & Kenyon

[57] ABSTRACT

A system and method for the rapid creation of a mesh model depicting a real world object, terrain or other three-dimensional surface. The system inserts points into the mesh incrementally, building the mesh point by point. Before incremental building, the system orders the points so that each next point is a near neighbor to the previously inserted point. This ordering procedure optimizes mesh construction by guaranteeing a minimal time for locating the area on the mesh into which the next point will be inserted. The present invention also provides a system and method to ensure an optimal quality of mesh at any level of insertion or deletion, following systematized checking function to maintain quality such as that required in Delaunay triangulation. The system and method can also incorporate a history file to store data concerning the results of the checking to substantially reduce processing time in mesh regeneration applications.

21 Claims, 26 Drawing Sheets

U.S. PATENT DOCUMENTS

| | | |
|---|---|---|
| 5,590,248 | 12/1996 | Zarge et al. . |
| 5,602,979 | 2/1997 | Loop . |
| 5,617,322 | 4/1997 | Yokota . |
| 5,630,039 | 5/1997 | Fossum . |
| 5,677,846 | 10/1997 | Kumashiro ............................. 364/488 |
| 5,710,878 | 1/1998 | McCoy et al. ........................... 395/129 |
| 5,731,817 | 3/1998 | Hahs, Jr. et al. ....................... 345/423 |

OTHER PUBLICATIONS

Eck, Matthias et al., "Multiresolution Analysis of Arbitrary Meshes" Technical Report #95–01–02.

DeRose, Tony et al., "Fitting of Surfaces to Scattered Data", In J. Warren, editor, Curves and Surfaces in Computer Vision and Graphics III, Proc. SPIE 1830:212–220, 1992.

Hoppe, Hugues, "Generation of 3D Geometric Models from Unstructured 3D Points," Microsoft Corporation.

Turk, Greg et al., "Zippered Polygon Meshes from Range Images" Computer Graphics (SIGGRAPH '94 Proceedings), 28(3):311–318, Jul. 1994.

"Basic Methods and Algorithms: Voronoi Diagrams, Delaunay Triangulation and Construction of a TIN" Internet site http://www.iko.no, Printed Feb. 12, 1996.

Agishtein, Michael et al, "Smooth Surface Reconstruction from Scattered Data Points", *Comput. & Graphics*, vol. 15, No. 1, pp. 29–39, 1991.

Agishtein, Michael et al., "Geometric Characterization of States in Two–Dimensional Quantum Gravity", submitted to *Physics Letters B*, pp. 1–12, Mar. 1990.

Agishtein, Michael et al., "Dynamics of Vortex Surfaces in Three Dimensions: Theory and Simulations", *Physica D* 40, pp. 91–118, 1989.

Certain, Andrew et al., "Interactive Multiresolution Surface Viewing", *SIGGRAPH 96 Conference Proceedings*, pp. 91–98, 1996.

Cohen, Jonathan et al., "Simplification Envelopes", *SIGGRAPH 96, Computer Graphics*, Aug. 1996.

*Eckel, Bruce, "C++ Inside and Out", Osborne McGraw Hill, 1993.

Hoppe, Hugues et al., "Mesh Optimization", *Computer Graphics Proceedings, Annual Conference Series*, pp. 19–26, 1993.

Hoppe, Hugues, "Progressive Meshes", *SIGGRAPH 96 Conference Proceedings*, pp. 99–108, 1996.

Lindstrom, Peter et al., "Real–Time, Continuous Level of Detail Rendering of Height Fields", *SIGGRAPH 96 Conference Proceedings*, pp. 109–117, 1996.

Migdal, A.A., "Dynamically Triangulated Random Surfaces", *Nuclear Physics B*, Proc. Suppl. 9, pp. 625–630, 1989.

*Preparata and Shamos, "Computational Geometry", Springer–Verlag, New York, 1988 (second printing).

Schroeder, William, et al., "Decimation of Triangle Meshes", *Computer Graphics*, 26(2), pp. 65–80, Jul. 1992.

Shewchuk, Jonathan, "A Two–Dimensional Quality Mesh Generator and Delaunay Triangulator", Triangle Website, http://www.cs.cmu.edu/People/quake/triangle.html, printed Mar. 16, 1997.

*Stroustrup, Bjarne, "C++ Programming Language", Addison Wesley Publishing Co., 1991.

"Multiresolution Modeling", Internet site http://www.cs.cmu.edu/afs..d/www/multires, printed May 7, 1997.

Silicon Graphics Indigo$^2$ Impact Website, http://www.sgi.com/Products/hardware/Indigo2/tech.html, printed Jun. 22, 1997.

Silicon Graphics Technology Website, http://www.sgi.com/Product/hardware/desktop/tech.html, printed Jun. 22, 1997.

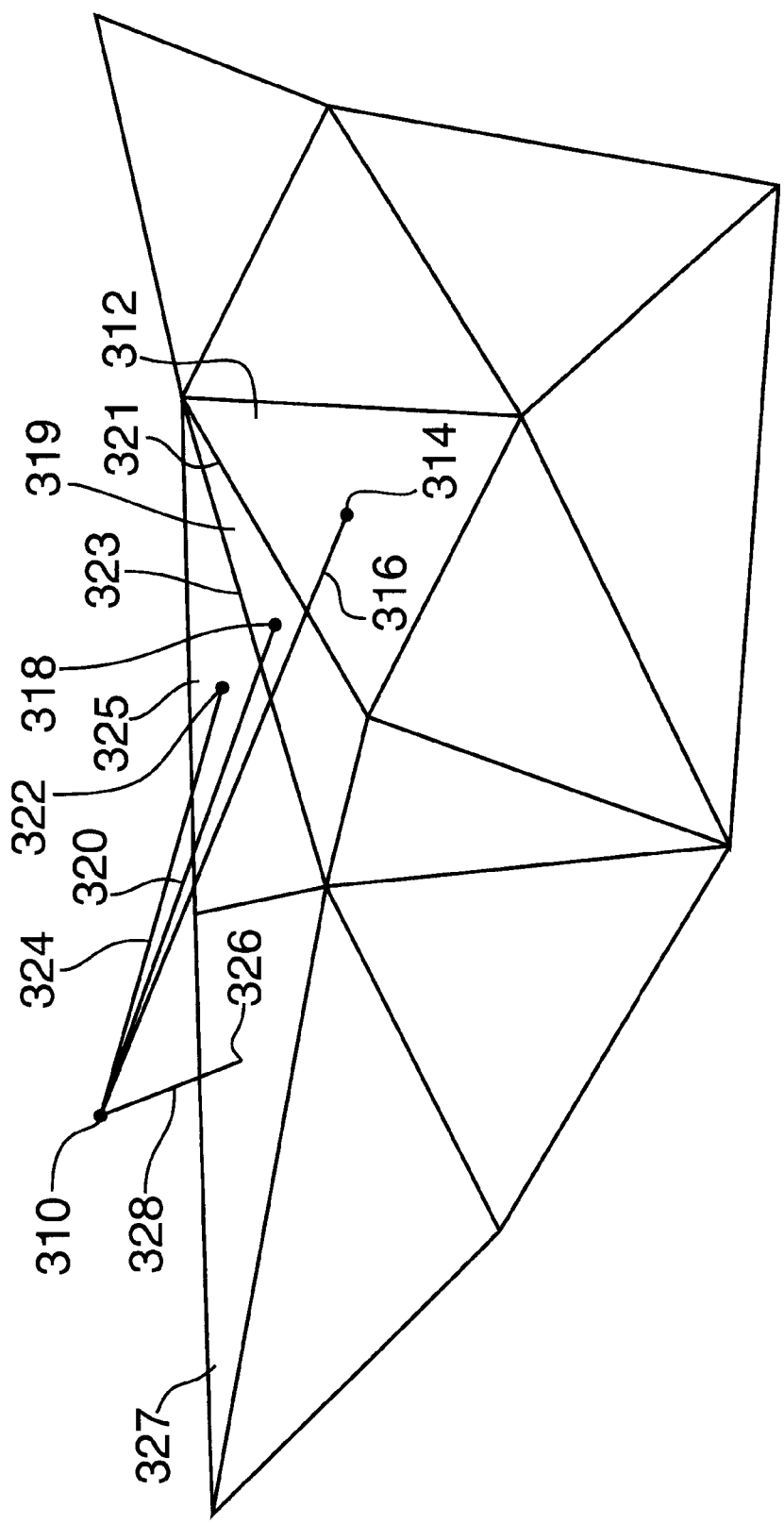

SYSTEM AND METHOD FOR RAPIDLY GENERATING AN OPTIMAL MESH MODEL OF A 3D OBJECT OR SURFACE

CROSS-REFERENCE TO RELATED APPLICATIONS

This application is related to co-pending United States patent application entitled "System and Method for Computer Modeling of 3D Objects or Surfaces By Mesh Constructions Having Optimal Quality Characteristics and Dynamic Resolution Capabilities" filed on even date herewith. That co-pending application is also expressly incorporated herein by reference.

FIELD OF THE INVENTION

This invention relates to computer systems for three-dimensional ("3D") modeling of real-world objects, terrains and other surfaces. In particular, this invention relates to computer systems which rapidly generate optimized mesh models of objects and surfaces.

BACKGROUND OF THE INVENTION

There is great interest in the development of computer systems which enable users to generate quickly accurate displays and reproductions of real world objects, terrains and other 3D surfaces. A graphic display and manipulation system generates a mesh model of the object, terrain or surface, uses that mesh model as a basis to create the display or reproduction and allows the user to manipulate the model to create other displays such as "morphs," fantasy displays or special effects. A mesh model represents an object, terrain or other surface as a series of interconnected planar shapes, such as sets of triangles, quadrangles or more complex polygons. More advanced graphic display systems provide rapid zoom and "walk around" capabilities (allowing the viewer to make his or her perceived vantage point appear to move closer to, farther from or about an object or surface). These systems must have the ability to quickly generate a mesh of high quality for reproduction of the object.

A set of data points that describes the object or surface provides basic data for the mesh. The data points represent actual, measured points on the object, surface or terrain. Their values come from a number of sources. A user can input data points based on measurement or planned architecture or they can be generated through scanning and other measuring systems. A scanning system uses a light source such as a laser stripe to scan and a camera to collect images of the scanning light as it reflects from the object. A scanning system processes the information captured in the images to determine a set of measured 3D point values that describe the object, surface or terrain in question. Scanning systems can easily gather the raw data of several hundred thousand 3D coordinates. The data points come to the mesh modeling system as a group of randomly distributed points. Other data concerning the object, terrain or surface, such as a texture map, ambient light data or color or luminosity information, can be associated or used in conjunction with the geometric shapes of the mesh.

Typical mesh modeling systems use data points either indirectly (in gridded network models) or directly (in irregular network models) to create meshes. U.S. Pat. No. 4,888,713 to Falk and U.S. Pat. No. 5,257,346 to Hanson describe ways of creating gridded mesh representations. Gridded network models superimpose a grid structure as the basic framework for the model surface. The grid point vertices form the interconnected geometric faces which model the surface. The computer connects the grid points to form evenly distributed, geometric shapes such as triangles or squares, that fit within the overall grid structure. While gridded models provide regular, predictable structures, they are not well suited for mesh construction based on an irregular, random set of data points, such as those generated through laser scanning (as mentioned above). To fit the irregular data points of a laser scan into a rigid grid structure, the data point values must be interpolated to approximate points at the grid point locations. The need to interpolate increases computation time and decreases the overall accuracy of the model.

Compared to a gridded model, an irregular mesh model provides a better framework for using irregular data points, because the irregularly-spaced data points themselves can be used as the vertices in the framework, without the need to interpolate their values to preset grid point locations. A typical irregular network meshing system builds a mesh by constructing edge lines between data points to create the set of geometric faces that approximate the surface of the object or terrain. There has been widespread interest in building irregular mesh models having planar faces of triangular shapes, as only three points are needed to determine a planar face.

While irregular triangular meshes offer the possibility of more accurate displays, the systems to implement them are more complex compared to gridded network models. The limitations of the computer hardware and the complexity inherent in the data structures needed for implementation of irregular mesh building systems has prevented their widespread use. U.S. Pat. No. 5,440,674 to Park and U.S. Pat. No. 5,214,752 to Meshkat et al. describe meshing systems used for finite element analysis, i.e., the partitioning of CAD diagrams into a series of mesh faces for structural analysis, not the creation of a mesh from a series of raw data points. As such, the systems do not appear suitable for the rapid mesh generation requirements of applications such as computer animation and special effects and they do not appear suitable for creating meshes from a large number of sampled data points.

For computer mesh applications involving the hundreds of thousands of 3D data points typically used in computer graphics and animation and graphic display systems, there is a need for the creation of a mesh system which can generate a mesh with substantial speed. Speed and data storage requirements are also important factors in graphic display applications on communication systems such as the Internet. Currently, Internet graphic displays are typically communicated as massive 2D pixel streams. Each and every pixel displayed in a 2D image must have a pixel assignment. All of those pixel assignments must be transmitted via the communications system. Such a transmission requires large amounts of communication time. Further, if movement is depicted in the display, information must be continuously sent over the communications system to refresh the image or, in the alternative, one large chunk of pixel data must be downloaded to the receiving terminal before the display can begin. Replacing the 2D image display system with a 3D modeling system substantially reduces the amount of data needed to be transmitted across the communication system, because with a 3D modeling system only representative 3D data points need be sent—not a full set of assignments for every pixel displayed. A mesh generating system located at the receiver terminal could generate a full display of the object upon receiving relatively few 3D data points. Currently available meshing systems do not provide this capability.

The demands of computer animation and graphic display also call for improvement in the quality of the mesh. In the case of an irregular triangulated mesh, for example, when the angles of one triangle's corners vary widely from the angles of another triangle or the triangles differ wildly in shape and size, the mesh tends to be difficult to process for functions such as "gluing" (joining a mesh describing one part of an object to a mesh describing an adjacent part). Such a mesh will also display badly. For example, a non-optimized triangulated mesh might show a jagged appearance in the display of what are supposed to be smooth curving surfaces like the sides of a person's face. Generally, an underlying mesh model constructed from small, regularly angled triangles that tend towards being equilateral is preferable.

The procedure of B. Delaunay known as "Delaunay Triangulation" is one optimization theory which researchers have attempted to implement for the construction of a high quality, irregular meshes with homogeneous triangular structure. Delaunay's theories for the creation of irregular mesh lattices derive from the teachings of M. G. Voronoi and the studies he made of "Voronoi polygons". Voronoi determined that, for a set of data points in space, a proximity region could be defined for each data point by a convex polygon created from the perpendicular bisectors of lines drawn from the point in question to its nearest neighbors. FIG. 1a shows an example of a Voronoi polygon. Each data point is bounded by a unique Voronoi polygon created through those bisecting lines. The edges of each Voronoi polygon are shared with Voronoi polygons for the interconnected points. Thus, Voronoi's method describes a surface with a series of unique, complex polygons. FIG. 1b depicts an example of a Voronoi polygon diagram.

Delaunay's theories follow the teachings of Voronoi and seek to create an irregular triangulated mesh with a tendency for homogeneous triangles. It has been proven that every vertex of a Voronoi diagram is the common intersection of exactly three polygonal edges. Equivalently, it has been proven that each vertex of a Voronoi polygon is a center of a circle defined by three of the data points bounded by the Voronoi polygons. See, e.g., *Computational Geometry*, Preparata and Shamos, New York, Springes-Verlag, 1988 (second printing). From those observations, it is possible to create from any Voronoi diagram a "straight-line dual" diagram having similar properties. FIG. 1c depicts a straight line dual diagram made from the data points bounded by the Voronoi polygon in FIG. 1b. Notice that the "straight-line dual" is a triangular mesh constructed using the actual data points, not the vertices of the Voronoi polygons created by the bisecting lines. The straight-line dual diagram forms its triangular mesh shape by constructing straight line segments between each pair of data points whose Voronoi polygons share an edge. (See FIG. 1c.) It has been proven that a straight line dual of a Voronoi diagram always produces an irregular triangulated mesh. Ibid.

Delaunay used the Voronoi straight line dual to create triangulated lattices with properties derived from an understanding of the Voronoi polygonal diagram. When a triangulation follows Delaunay principles, a circumcircle defined by the vertices of a triangle will not contain another data point of the mesh. FIG. 1d depicts a circumcircle for determination of whether the triangle meets the Delaunay optimality criteria. A Delaunay mesh procedure guarantees that for each triangle of the mesh the area within a circumcircle created from the three vertices will not contain any other data point of the mesh.

Research shows that a triangulated mesh which adheres to the Delaunay circumcircle principle yields an optimied mesh which behaves well in display and graphic manipulations systems. However, Delaunayian meshing procedures, such as those described by Park and Meshkat, for example, do not operate at high speed to build a mesh from a large set of raw data points. The few currently available meshing procedures which even attempt to optimize Delaunay theories use slow recursive means that rely on time-consuming parameter passing and checking steps. Such problems have stifled the use of real-life object depictions in computer graphics applications.

Therefore, it would represent a substantial advance in the field if a computer modeling system could be developed that allows for rapid generation of a mesh optimized by principles such as those set forth in the theories of Delaunay and Voronoi. Such a system would enable computer graphics systems to use real world images in all applications. The system would enable communication systems, such as the Internet, to display and manipulate images and models of the real world objects more rapidly.

SUMMARY OF THE INVENTION

The present invention provides a system and method for rapid computer creation of a mesh with optimized faces. The mesh building system and method operates incrementally to build the mesh point-by-point in successive additions. As each point is added, optimality is preserved through a rapid, non-recursive checking procedure. In an exemplary embodiment, the system of the present invention creates a triangulated mesh, optimized by Delaunay principles. Each point is added by linking it to other related points. The system creates an initial mesh from a few points in reference to an initial reference object, such as a plane or sphere. Once the system establishes an initial Delaunay triangulated mesh, new points may be added quickly. First, the system locates the triangle in the existing mesh into which the next point will be added. Next, the system splits this triangle into three triangles, each containing two vertices of the original triangle and the new vertex. The links between the old vertices and the new point form the geometric edges of the triangle. Next, the system checks each triangle in the neighboring area around the insertion point, reconstructing the mesh if necessary by "flipping" the edges of the triangles to maintain an optimal triangulation, such as a Delaunay triangulation. Where the reference object is a plane, the meshing system may add points to the edge of the mesh and not in a triangle. That case is handled separately. The system operates in order (n log n) time and can provide a full mesh of 100,000 data points in ~1.7 seconds operating on a 195 MHz R10000 processor.

One aspect of the system and method is the processing of the data points to create an ordered list for point insertion which is followed during incremental mesh building. In locating a position into which a new data point can be inserted into the mesh (the first step of the incremental procedure outlined above), the present invention teaches that considerable time is spent locating the correct mesh face or mesh edge for insertion. Ordering the points before mesh building speeds the location process substantially. The exemplary ordering technique presented is to locate for each data point a nearest neighbor data point to ensure that the next point added is very close to the face or edge location where the system inserted the last point. The system and method of the present invention provides an ordering routine which guarantees a next point which is very close in proximity to the face where the last point was inserted. The ordering routine is recursive; the checking routine is non-recursive. Together the two procedures permit meshing with excellent speed.

In addition, to the point ordering before insertion, the present invention presents a rapid method to locate a mesh face into which a new point can be inserted. To find the new triangle for point insertion the system defines two points, such as points A and B. Point A is the center-point of the last inserted face; point B is the next data point from the ordered list. The system then calculates the line connecting A to B and tests each edge of the triangle containing A (the last inserted triangle) to determine whether one of its edges intersects with the AB line on a surface projection. If the system finds that the AB line intersects an edge, it moves to the neighboring triangle that shares that edge, sets A to the midpoint of the new, neighboring triangle and repeats this process until it finds the correct triangle into which the next point will be inserted. (The correct triangle is the one determined by the fact that no edge-intersection is found).

Another aspect of the present invention is its system and method to create mesh of optimized quality from the list of ordered data points. As stated above, the present invention provides a checking process that works in a step-wise manner to implement an optimization heuristic such as a Delaunay triangulation. It is an aspect of this invention that a mesh of optimal quality is maintained at all times, even as single points are added or deleted from the mesh.

To insert a new data point into the mesh, a set of computer program elements and data structures enable a computer processor to implement a series of changes. An inserted point creates additional mesh faces. The inserted point may also require alterations of the edges of the faces to preserve optimality. The system rigidly orders the vertices of the new triangular faces created by the inserted point. In an exemplary embodiment, the vertices of the triangles are ordered in counterclockwise fashion. However, a clockwise or other rigid ordering system is also suitable. The edges of the newly created triangles and the neighboring triangles related to those edges are also ordered in relation to the counterclockwise or other ordering of the vertices of each face. The present invention performs optimality checks in a systemized way, moving in a single direction following the ordering of the points, such as proceeding counterclockwise around the insertion point. The regularized indexing of the vertices (in the counterclockwise or other order) enables the checking procedure to easily orient itself within the mesh and quickly maneuver to check for optimized quality. Thus, the present invention provides substantial speed in a non-recursive checking procedure.

As stated above, the present invention works in a sequenced, step-wise manner to implement an optimization heuristic such as a Delaunay triangulation. It is an aspect of this invention that a mesh of optimal quality is maintained at all times in mesh generation. Delaunay principles dictate that a circumcircle created by the vertices of any mesh triangle will not contain any other data point. If the triangle does not pass that test, then it is not considered optimal and the edges between the vertices must be redefined or "flipped" to create a new set of triangles. The system insures that the vertices and neighbor relationships of the flipped triangles also allow for sequenced checking.

After flipping, the system and method of the present invention continues to check for optimization, rechecking the flipped triangles and their neighbors. The present invention teaches that an entire triangulation check take place in an ordered fashion, such as a counterclockwise or other order as described above.

As each face is checked, the present invention provides that the results of each check be stored in a history list data structure. The system and method of vertex indexing and the system and method of regularized checking enables the present invention to store only minimal information about the checking. The minimal storage requirements allow for application of the present invention on communication systems like the Internet. The history list which stores the sequence of checking steps can then be used to regenerate the mesh.

The history file can be used for mesh construction to gain substantial speed increases when regenerating a mesh. After one mesh is built to full resolution using the point ordering and checking procedures outlined above, the mesh can be almost instantaneously generated using the history file to execute flips instead of reexecuting the insertion checking procedures. With the history file, the present invention can mesh with very high speeds. The speed will vary depending on the size of the data cache permitted for the data points in the computer system. For a cache of 100,000 points in a 195 MHz R10000 processor, the surface meshes at 700,000 triangles/second. For a cache of 25,000 data points, the system meshes at a speed of 750,000 triangles/second. For a cache of 4,000 data points, the system can mesh at a speed of 1,250,000 triangles/second.

The system and method of the present invention comprises computer hardware, programmed and data structure elements. All the elements set forth are described in more detail below.

BRIEF DESCRIPTION OF THE DRAWINGS

FIG. 10b Depicts an exemplary process of locating a face with which an unmeshed point can be associated.

DETAILED DESCRIPTION i. Rapid Mesh Building System

Figure 1A:
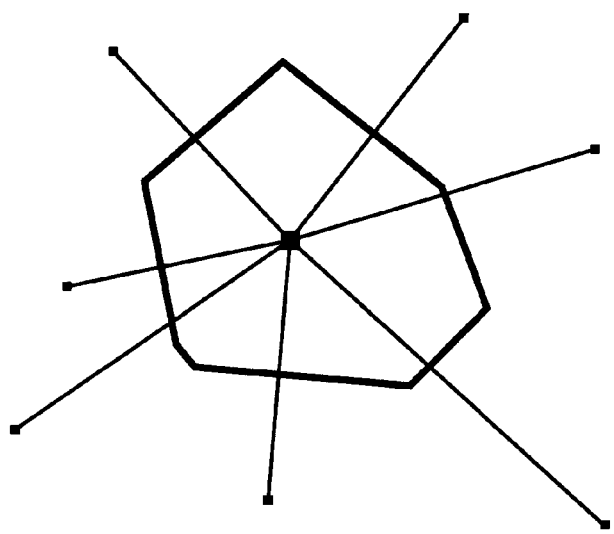
FIG. 1a Depicts a diagram of a Voronoi polygon drawn around a data point, and its set of nearest neighbors.
Figure 1B:
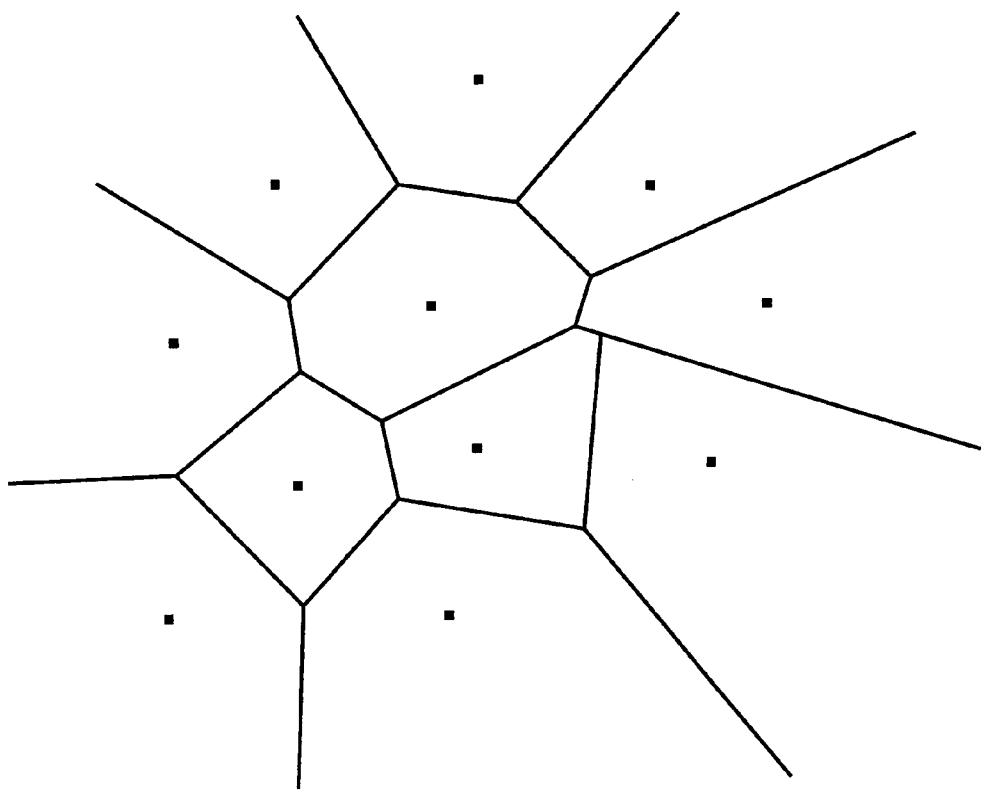
FIG. 1b Depicts a diagram of Voronoi polygons for a set of data points.
Figure 1C:
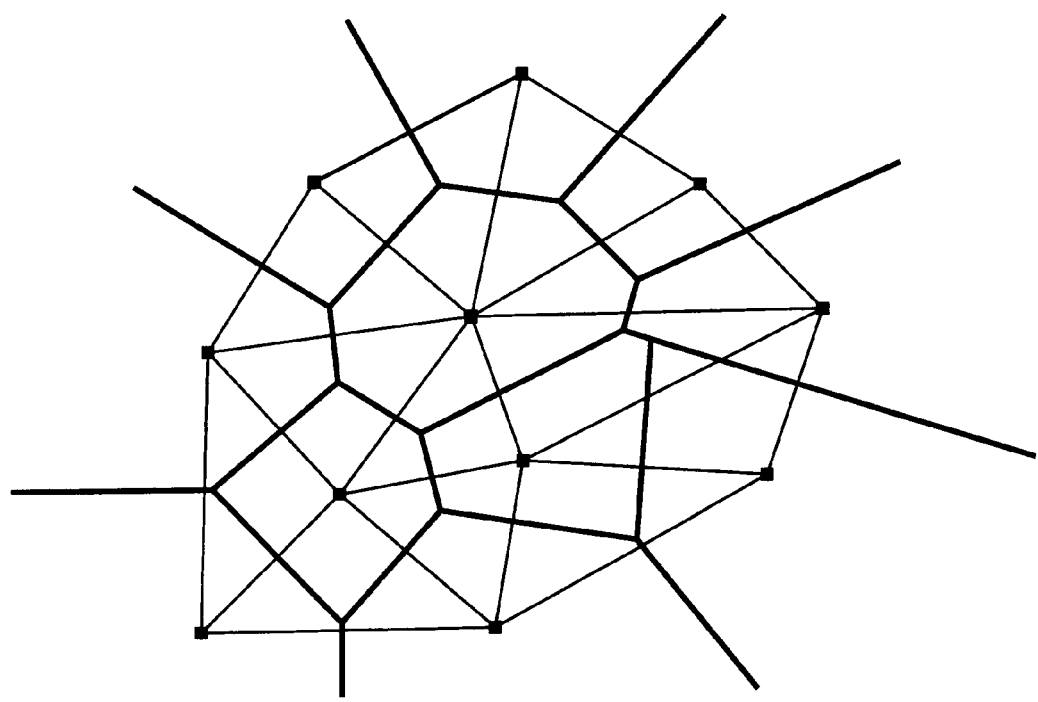
FIG. 1c Depicts a straight line dual triangulation for the Voronoi diagram of FIG. 1b.
Figure 1D:
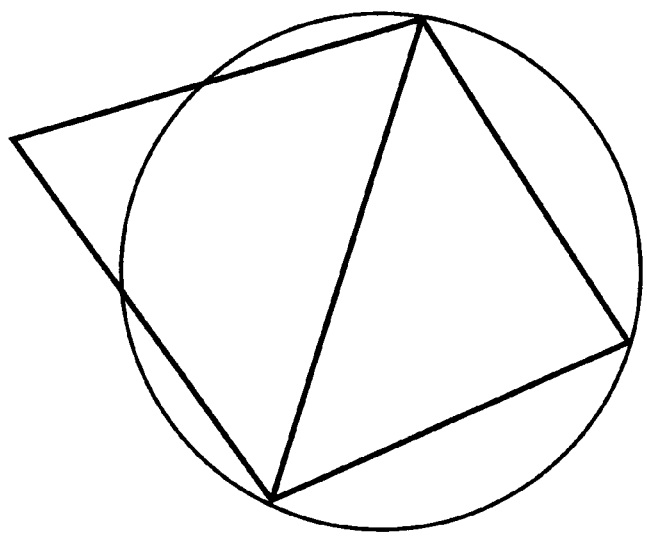
FIG. 1d Depicts a circumcircle drawn for a triangular in a Delaunay triangulation showing that the region bound by the circumcircle contains no other point.
Figure 2:
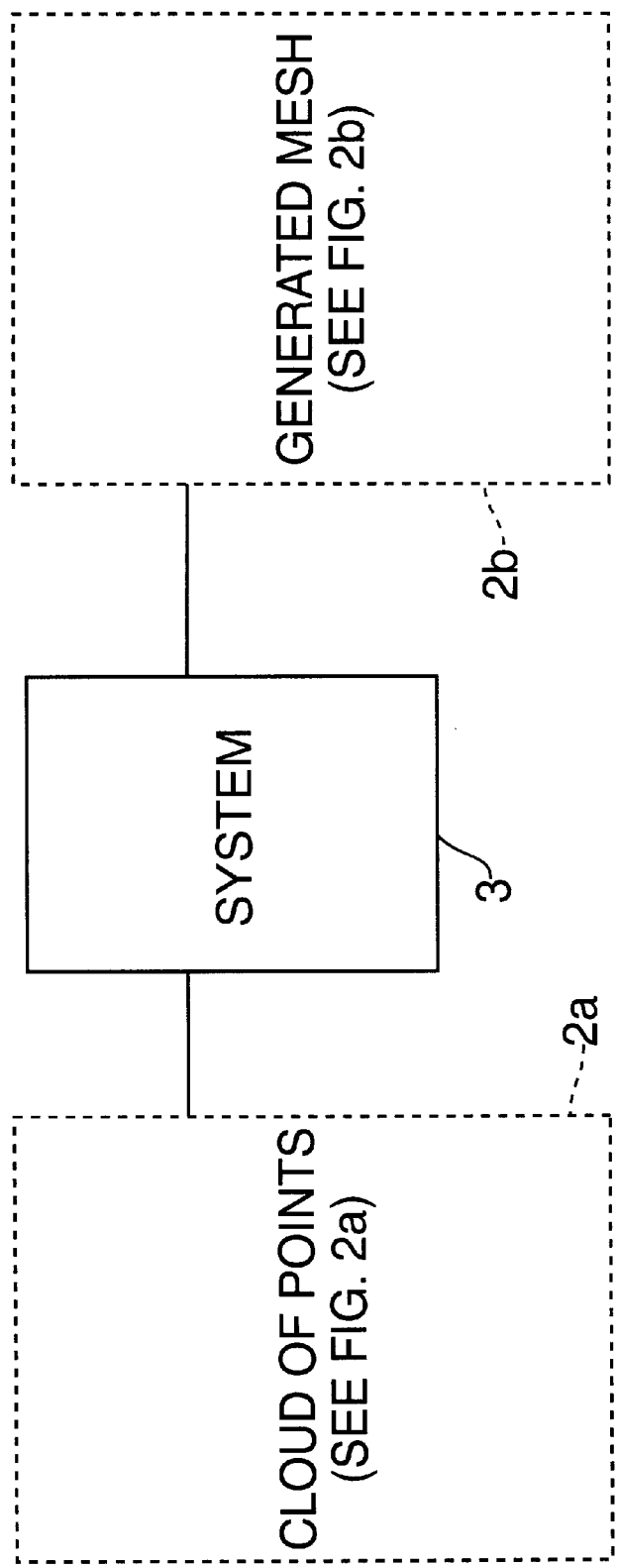
FIG. 2 Depicts a plurality of data points and their transformation into a triangulated mesh according to the present invention.
Figure 2A:
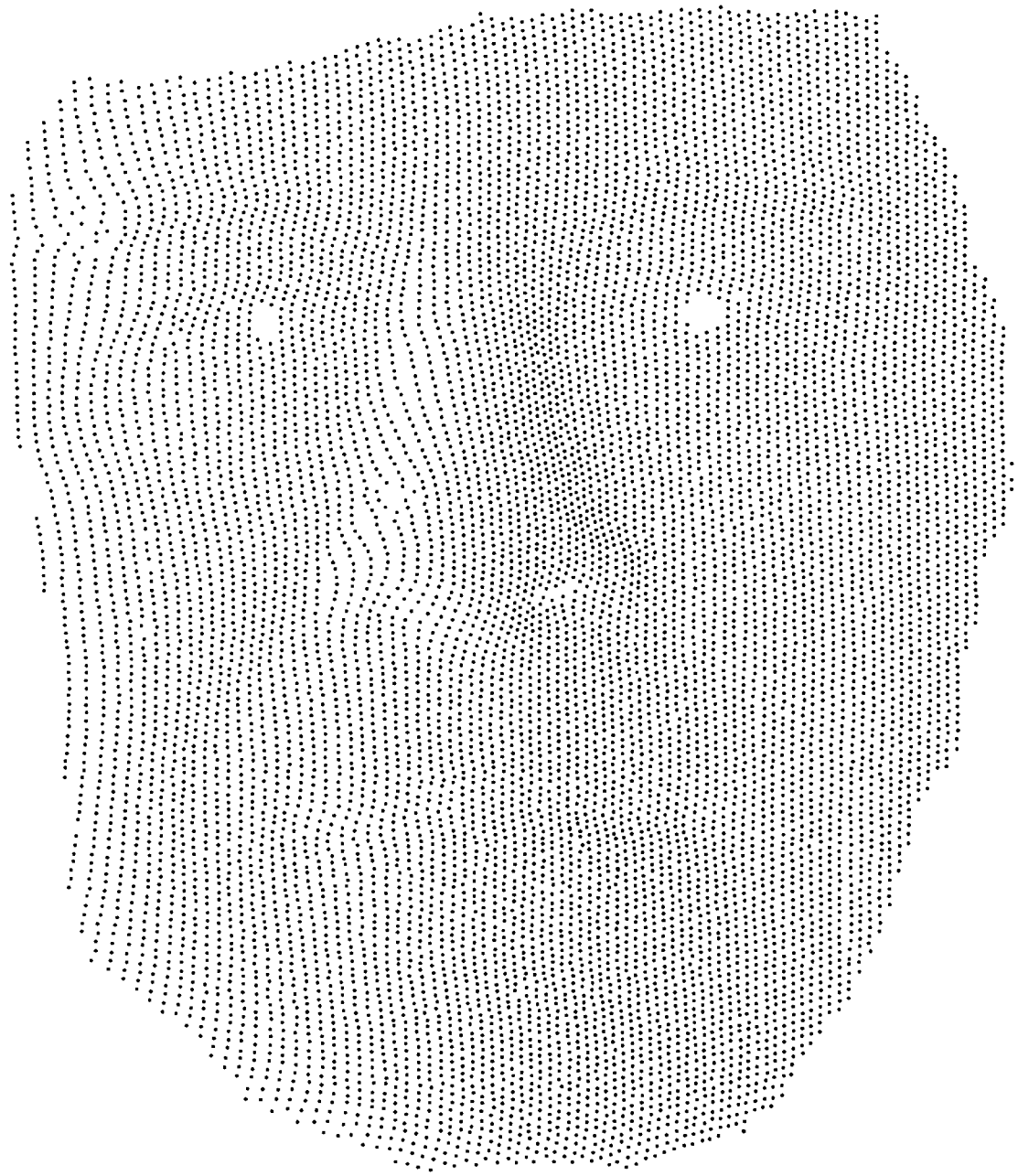
FIGS. 2a–b Depicts a representation of a plurality of data points and its transformation into a triangulated mesh.
Figure 2B:
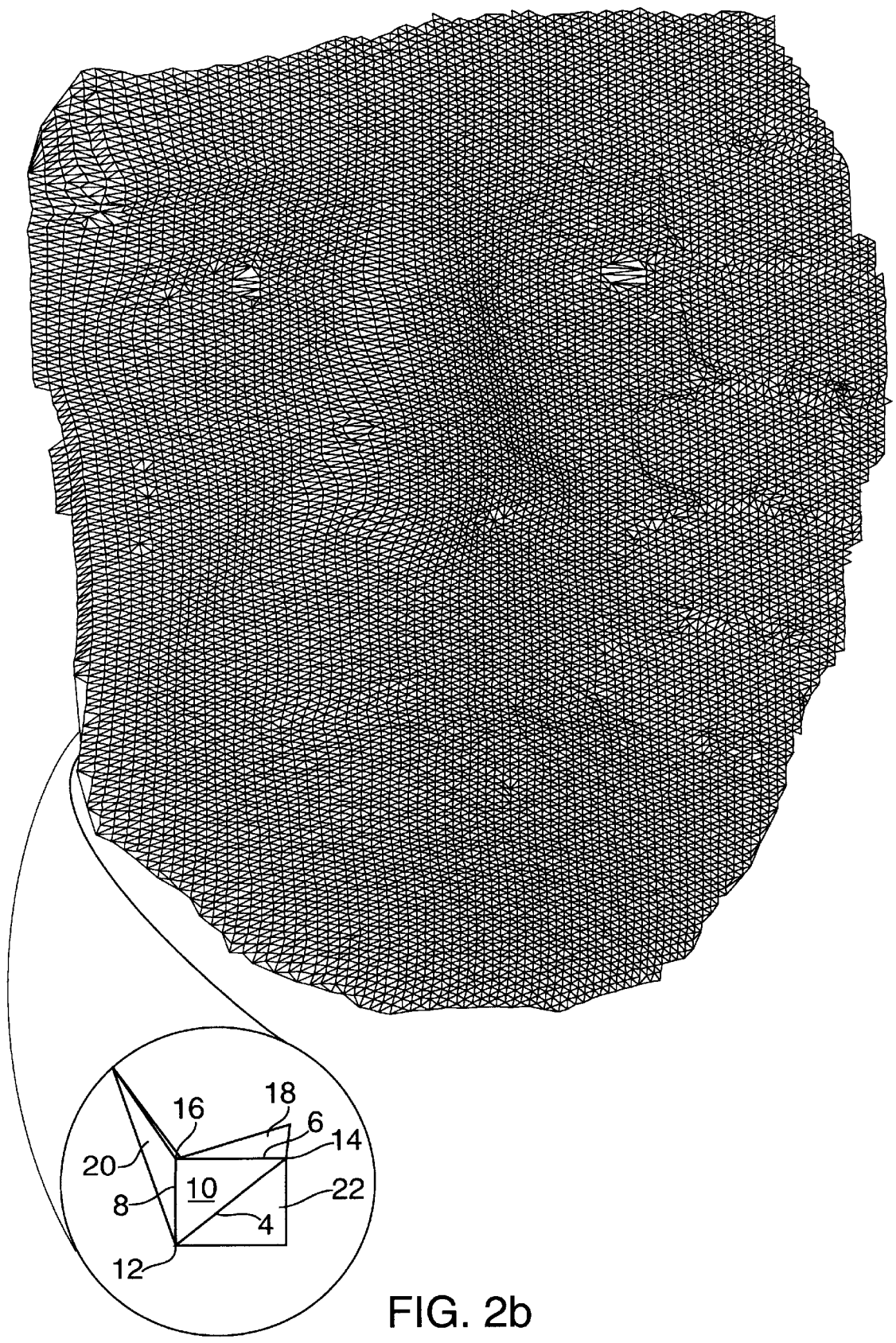

FIG. 2 depicts a plurality of data points 2a and their transformation into a mesh 2b created computer system 3 which follows the rapid mesh generation system and method of the present invention. FIG. 2a depicts an exemplary plurality of data points 2a. The plurality of data points 2a, also referred to as a cloud of points, can be collected by any number of means, such as by user input or scanning. A system and method for collecting data points through scanning is described in pending U.S. patent application Ser. No. 08/620,684, filed on Mar. 21, 1996 and entitled "System and Method for Rapid Shape Digitization and Adaptive Mesh Generation", and in pending U.S. patent application Ser. No. 08/669,498, filed on Jul. 12, 1996 and entitled "Portable 3D Scanning System and Method for Rapid Shape Digitizing and Adaptive Mesh Generation". Those applications are expressly incorporated herein by reference. The computer system 3 processes the incoming data points according to the teachings of the present invention and outputs a mesh model (represented by mesh 2b, FIG. 2b) which can be displayed, manipulated and used to create depictions of the modeled real-world objects, terrains and other surfaces.

The edges of the mesh, e.g., edges 4, 6 and 8, create faces such as triangle 10. The vertices of any face, e.g., points 12, 14, and 16 of triangle 10, are data points added through the incremental input of data points. Each triangle in the mesh, e.g., triangle 10, has a set of neighboring triangles, e.g., neighbors 18, 20, and 22. The faces, edges and vertices can be associated with other information concerning the object, such as normal data, texture data and ambient light information. In this way, the model can be used to output lifelike displays and other representations.

The embodiment of the system 3 employs a computer (not shown) comprising a central processing unit ( "CPU" or "processor"), to accept input data, manipulate the data, and create data structures related to the model building, and one or more memories, to receive the input data, house the data structures and programmed elements and store the results of the meshing operation. The computer also typically includes a display device, like a monitor, and inputs, like a keyboard and mouse. In an exemplary embodiment, the computer sold under the product name "Indy" and built by Silicon Graphics Incorporated is one computer that is suitable to implement the system of the present invention. For more information concerning the Silicon Graphics' Indy™ computer system, the reader is referred to the publications and references listed at the following website: htte://www/sgi.com/products/indy. A set of programmed elements provides instructions the processor executes to perform the operations of the computer system 3. In the exemplary embodiment, programmed elements are written in the C++ programming language. For more information on the C++ programming language the reader is referred to the following publications which are expressly incorporated herein by reference: The C++ Programming Language. Bjarne Stroustrup, Addison Wesley Publishing Co., 1991; C++ Inside & Out, Bruce Eckel, Osborne McGraw Hill, 1993.

ii. Exemplary Processes and Data Structures

Figure 3:
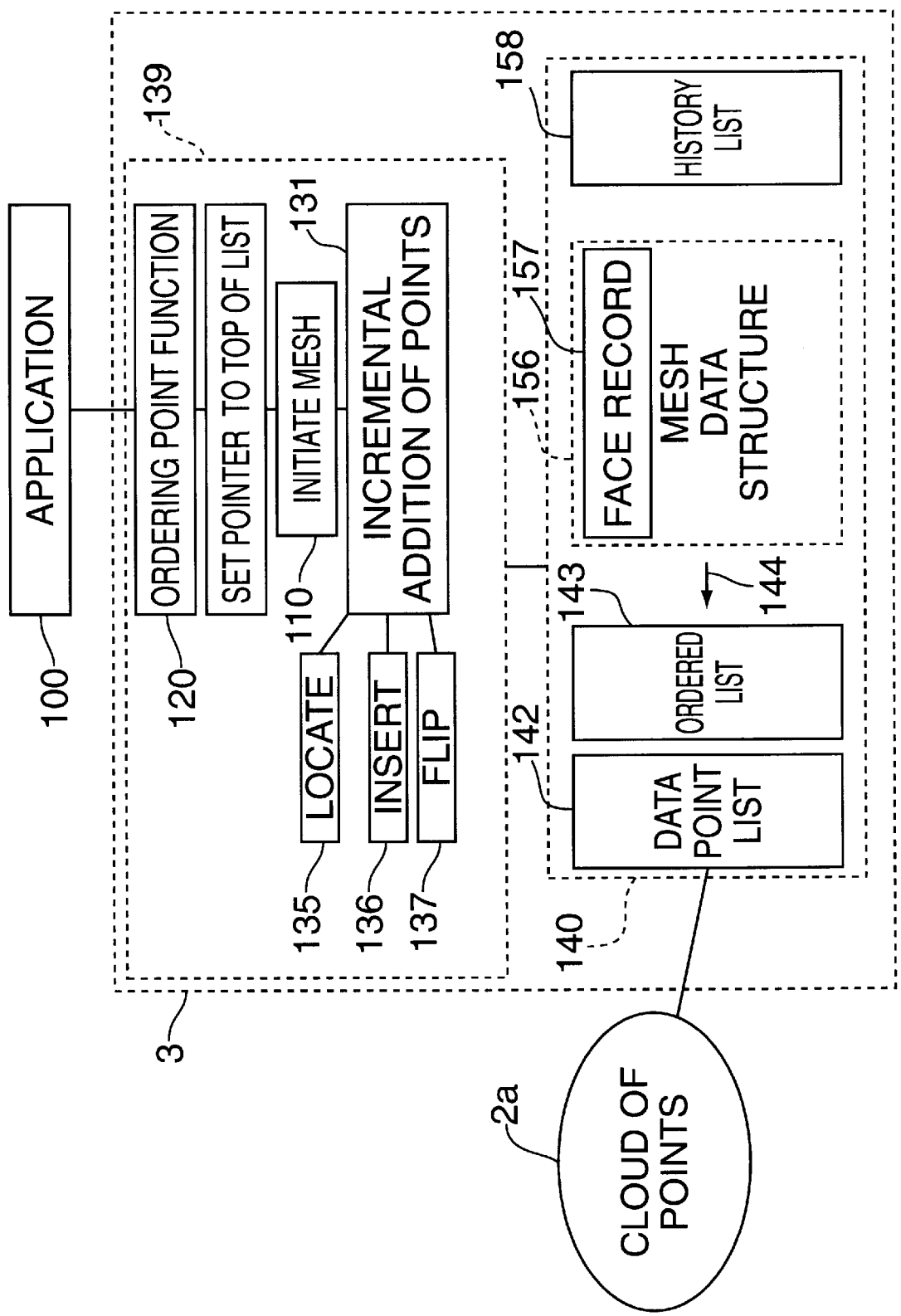
FIG. 3 Depicts an overview of basic programmed elements and data structures used to implement a rapid mesh building system.

FIG. 3 depicts an overview of an exemplary set of program elements and data structures to implement the system and method of the present invention (e.g., computer system 3). An initiate mesh function 110 establishes an initial mesh based on an initial reference object (e.g., a sphere, plane or other mathematically describable form) using a few data points. An ordering function 120 orders the remaining data points according to a scheme that speeds processing. In the exemplary embodiment of the ordering process creates a list by "nearest neighbor," such that each 3D point is very close in proximity to the one before it in the ordered list. After establishing the initial mesh, an incremental insert function 131 enables points to be incrementally inserted. The incremental insert function 131 also tracks the history of the insertions and maintains the optimal quality characteristics of the mesh. A locate function 135 determines the face into which the new point will be inserted. An insert point function 136 places the new point into the mesh. A flip function 137 checks a given triangle configuration for optimality and will reconfigure the faces if the initial configuration was not optimal. The basic program elements 139 of the computer system 3 can be invoked by any number of application programs (e.g., application 100) such as video game programs, graphic display programs, computer animators and special effects programs, for example.

Each of the basic programmed elements 139 will access one or more of a set of data structures 140. In the exemplary embodiment depicted in FIG. 3, a data point list 142 contains the 3D X,Y,Z coordinate values for each of the input data points, such as the cloud of points 2a depicted in FIG. 2a. In the exemplary embodiment, the data point list 142 can be a dynamically allocated array set to the number of data points input through user control or other input, such as by a scanning process. As the system then orders the data points for insertion into the mesh, an ordered list 143 contains a dynamically allocated array with slots that either directly correspond to, or are linked by, pointers to the vertex entries in the data point list 142. In the exemplary embodiment the ordered list 143 contains a sequence of points, each next point being very near to the last point. A pointer 144 enables the processor to proceed through the ordered list of points when generating or regenerating the mesh.

A mesh data structure 156 maintains information for each face, including its vertices, edges and neighboring faces. The mesh data structure 156 contains a plurality of face records (e.g., 157) which contains information concerning each geometric mesh face. The set of face records together form the data structure for the mesh model. In an exemplary embodiment, the system represents a face record in a triangulated mesh as follows:

| Record: "FACE" | |
|---|---|
| NEIGHBORS: | Neighbor #0, Neighbor #1, Neighbor #2 (Array of 3 pointers to other FACE records) |
| VERTICES: | Vertex #0, Vertex #1, Vertex #2 (Array of 3 pointers to vertices on data point list 142) |
| FLAGS | Integral numbers specifying properties of a face such as its position on a triangulation |

The data element NEIGHBORS consists of an array of three pointers, each pointing to a FACE record for a neighboring (adjacent) face in the mesh. The data element VERTICES is an array of pointers that references data points in the data point list 142.

Figure 4:
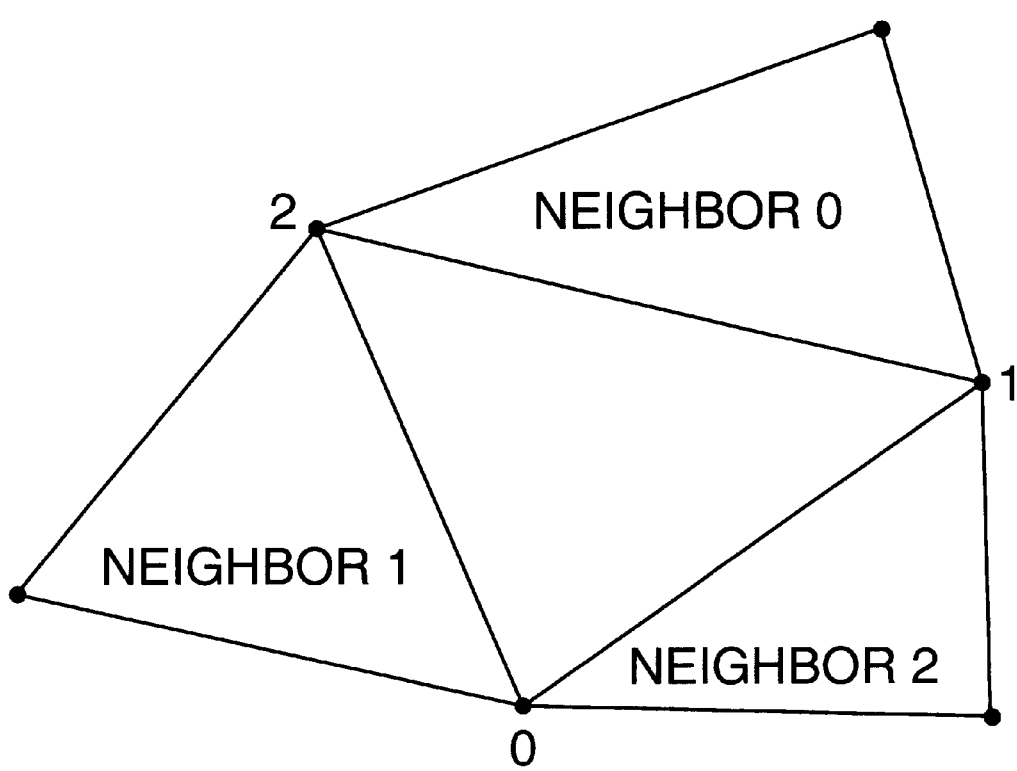
FIG. 4 Depicts an exemplary ordering of the points of a mesh face and shows the relationship of those points to neighboring faces according to the present invention.

The system stores data concerning each face in a manner organized according to the teachings of the present invention. In an exemplary embodiment, as shown by the triangle in FIG. 4, the system orders the points of a triangle in a counterclockwise sequence, 0, 1 and 2. It is understood that the vertices could also be numbered in clockwise order or ordered by another fixed ordering system. The system orders the neighboring triangles following the sequence of ordered vertices. The system indexes neighbor #0 to be directly opposite vertex 0. Neighbor #1 is directly opposite vertex #1. Neighbor #2 is directly opposite vertex #2. As is described below, the present invention provides a system to maintain this ordering while maintaining the optimality of the triangles in the mesh. When a point is inserted into the mesh, the system generates new face records for the mesh data structure. On point insertion, the mesh can require reconfiguration within the general neighborhood of faces around the inserted point to maintain optimality. This system uses the ordering of the vertices and neighbors (as is described in further detail below) to complete the needed mesh reconfigurations.

Consequently, when a new point is inserted, the neighborhood of faces around the addition must be checked for optimality and reconfigured if necessary. Referring again to FIG. 3, a history list 158 provides a data structure which is used to track the checks and changes executed by the system when reconfiguring the mesh to an optimal state. The present invention uses the history list 158 in conjunction with the ordered list 143 to perform rapid mesh regeneration after one initial mesh building procedure. When the system adds a new point to the mesh, it checks the configuration for optimality and adds a reference for each checking step on the history list 158. The history list 158 in the exemplary embodiment comprises a stack structure in which the indications of checks and changes are added in LIFO (last in first out) order. Because the system checks for optimality in a regularized way, the system can track all insertions. To perform extremely rapid mesh generations, the system will first build a history list 158 to full resolution and then simply use the history list 158 and the ordered list 143 to regenerate meshes.

The data structures 140 described above are used with the basic program elements to perform system functions. It is understood that the data structures 140 are exemplary, the teachings of the present invention can also be implemented using other data structure configurations. In addition to the elements described above, there are also a number of task performing subroutines and functions which are described below.

iii. Ordering Points for Incremental Mesh Building

The present invention provides a system and method for rapid mesh building by ordering the points for incremental insertion to a mesh. Although many different ordering techniques could be used to implement the present invention, in an exemplary embodiment, the system orders points, such that each point is very close to the one before it on the list. The system performs a recursive partitioning procedure to locate a "nearest neighbor" for each point in the data point list 142.

Figure 5:
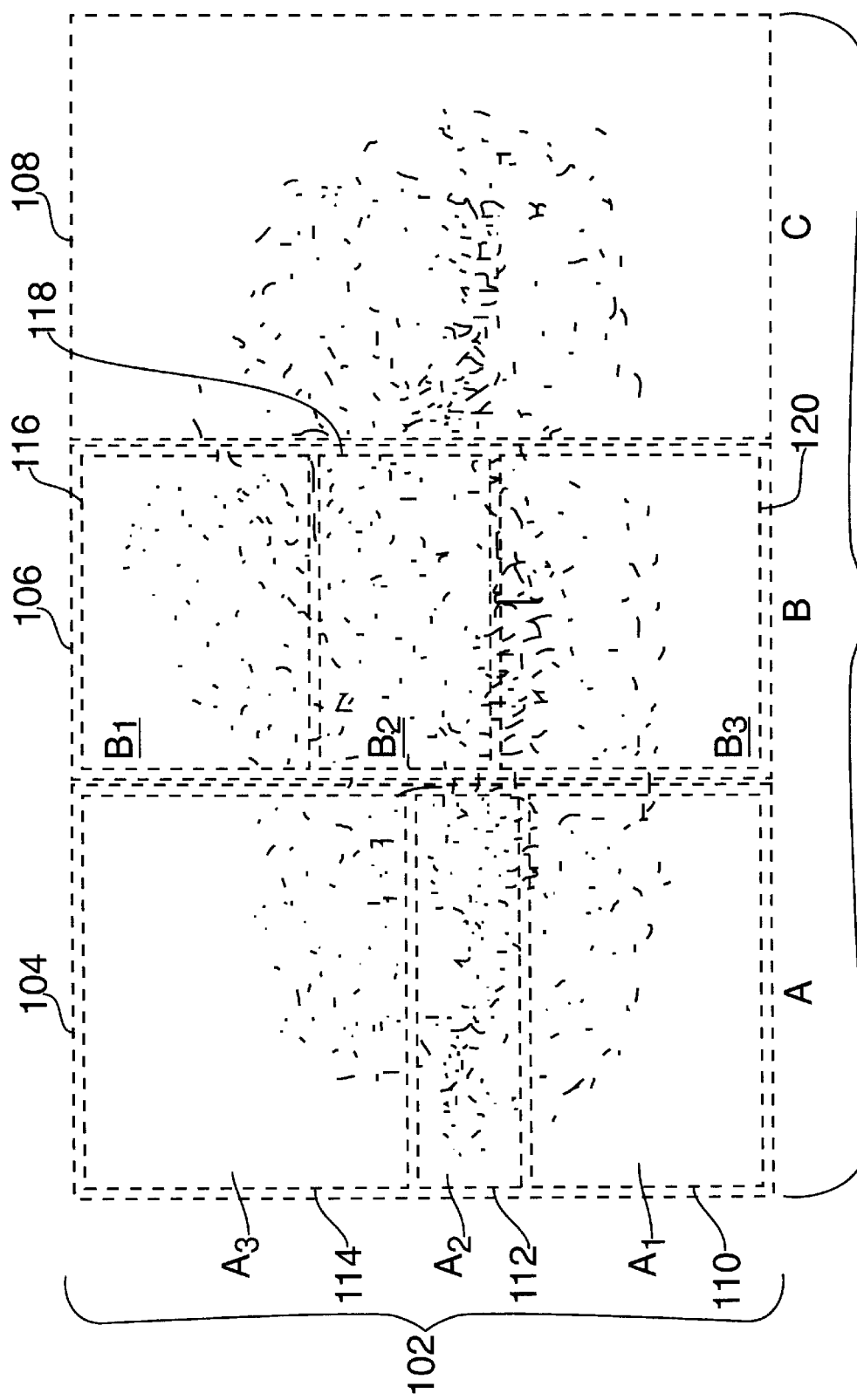
FIG. 5 Depicts a representation of a set of data points being ordered to locate a near neighbor according to the present invention.

FIG. 5 shows a representation of a set of data points being ordered to locate a near neighbor according to the present invention. In FIG. 5 the set of data points take the form of the cloud of points 2a from FIG. 2a. The system examines data point ranges and determines their largest extent by two of the three axes (e.g., such as by finding the largest extent along the X axis 100 or Y axis 102). In an alternative embodiment the largest extent can be determined by projecting the points onto a reference plane. The system then partitions the set into regions (e.g., square regions 104, 106 and 108) along that longer extent. Each region has approximately the same amount of points (plus/minus 1). The regions are then ordered (e.g., left to right) such that all of the points in region A, (104) will be ordered in the list before all the points in region B (106) and all the points in region B will be ordered in the list before all the points in region C (108). The algorithm continues to subdivide recursively and further order the points in each region 104, 106, 108. For example, in FIG. 5, region A subdivides into regions $A_1$ 110, $A_2$ 112 and $A_3$ 114.

In the subdividing procedure, the processor will reverse the partition order of any middle region to keep continuous movement of points between subdivisions. As seen above, the set of data points was partitioned initially in left to right order moving from region A 104 to region B 106 and region C 108. In subdividing these regions, the system will reverse the partition order for region B 106. The next partition of region A remains in left to right order with regions $A_1$ 110, $A_2$ 112 and $A_3$ 114. However, the partitions of region B 106 will proceed in right to left order with region $B_1$ 116, region $B_2$ 118 and region $B_3$ 120. This reverse ordering for the middle box permits the close neighbor approach to continue between partitions.

Figure 6:
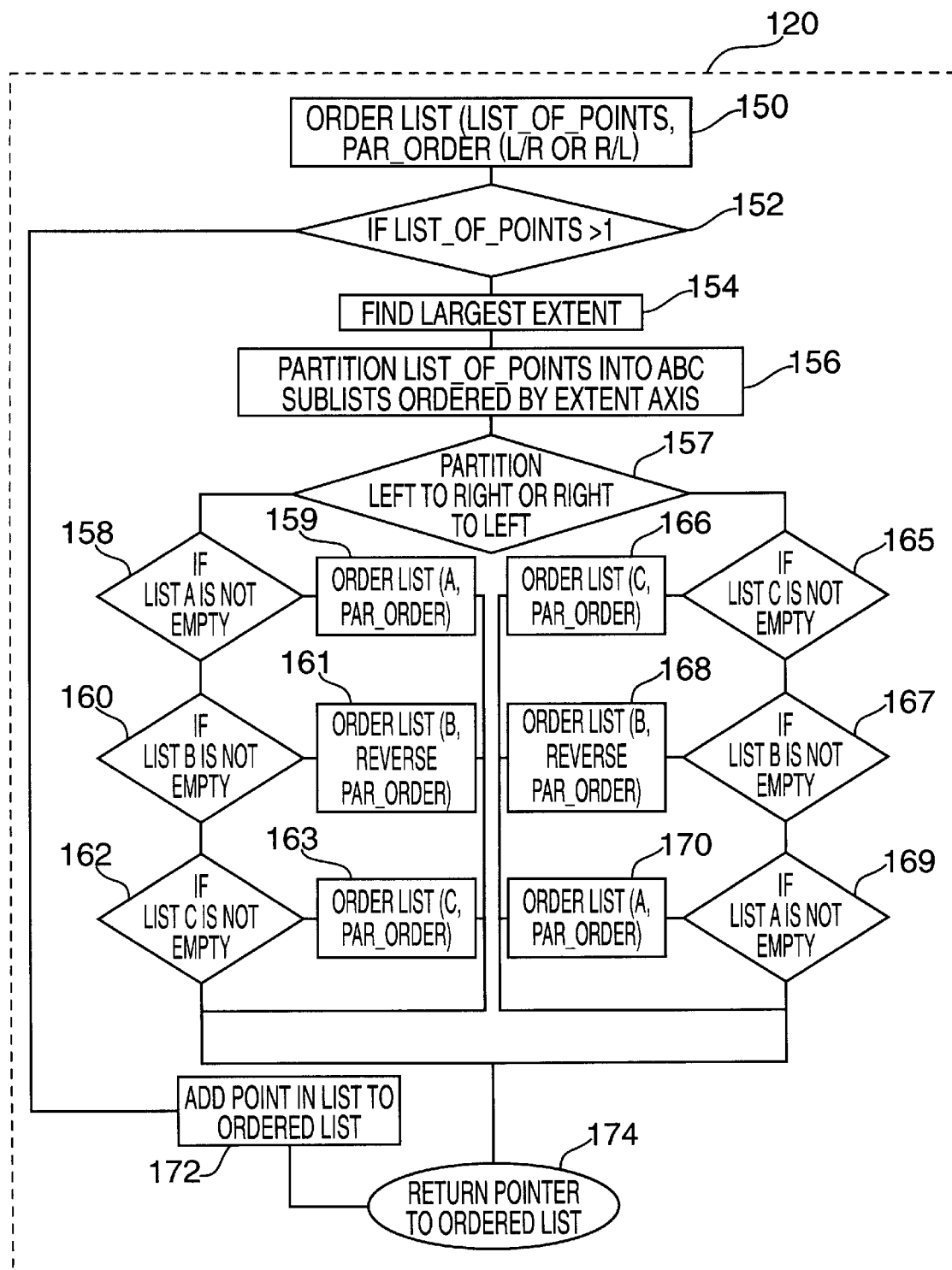
FIG. 6 Depicts an exemplary process flow for the ordering procedure of the present invention.

FIG. 6 depicts an exemplary process flow for the order points function 120 of the present invention. In step 150, the order points function 120 receives a set of points to be partitioned (or a pointer reference to the point) and an order indicator (e.g., left to right or right to left). The function 120 returns a pointer to the ordered list (143 from FIG. 3). In step 152, if the current list can be further partitioned, i.e., there is more than one point, the process of moves to step 154 to find the largest extent of the points to be divided. The system finds the largest extent by, for example, running through the list of data points to find the larger of the spread of values between the X and Y axes.

The processor then establishes partition lines along that larger extent axis in step 156. This partitioning can be accomplished by any one of a number of ordering procedures to divide the points into roughly three equal groups. The partitioning can be accomplished by subdividing the length of the largest extent into three partitions of equal size. However, the processor can also be configured to examine the data point values to shift the partitions so that each partition contains an equal number of points. In step 157, the processor begins the subdividing process and determines the partition order left to right or right to left. If there is a point existing in the partition (determined for each partition in steps 158, 160 and 162) the procedure recursively calls itself and subdivides that partition. The left to right ordered calls for partitioning each subdivision occurs in steps 159, 161 and 163. As stated above, the ordering is reversed for the middle list (list B) in step 157. (Steps 165–170 make the partitions in reverse order.) If in step 152 the list cannot be further subdivided, the procedure moves to step 172 to add the point to the ordered list 143, such as by creating a reference that refers to the 3D coordinate for that point on the data point list 142, and increment the pointer 144 for the ordered list. In step 174, the procedure resets the list location pointer to the top of the list and returns a pointer to the ordered list 143. The procedure continues in recursive fashion until the data points are organized into a list where each next point is a near neighbor to the last.

iv. Mesh Initiation

Figure 7:
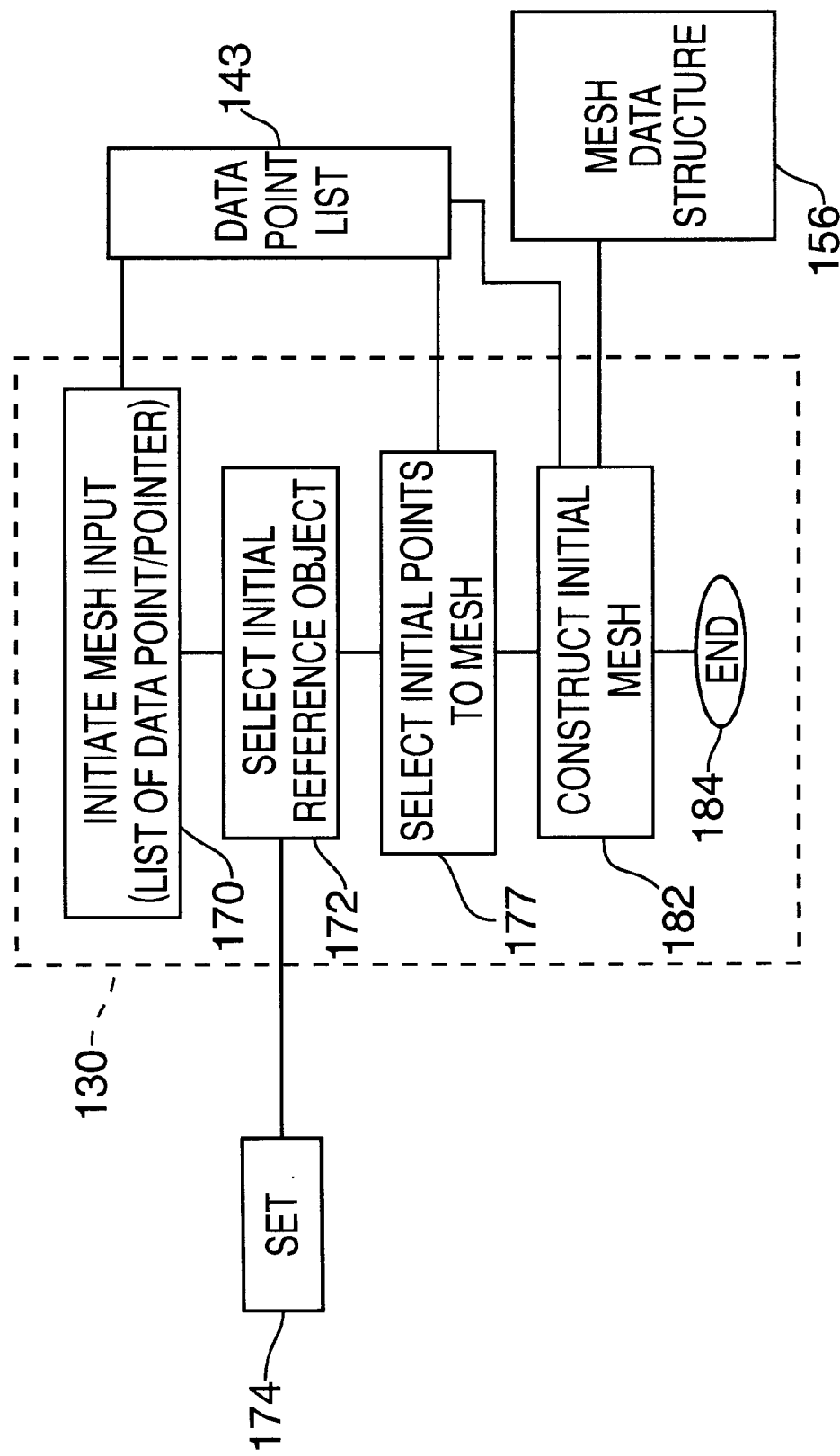
FIG. 7 Depicts an exemplary process flow for the initiate mesh function of the present invention.

FIG. 7 sets forth an exemplary process flow for the initiate mesh function 130 of FIG. 7. Step 170 sets forth the data input for the function, which is the data point list 142 or the ordered list 143, or some other device giving access to those lists of data points, like a pointer. In step 172, the processor operates to determine an initial reference object that the system will use to build the mesh. A user may wish to mesh in reference to different geometric objects. For example, the user may wish to mesh a set of data points for a view of a topographical surface or one side of a person's head with reference to a plane. However, on other occasions the set of data points may represent data points from both a front side and back side of an object (or all sides). For those point clouds, a user may wish to build meshes with reference to a sphere.

In FIG. 7 a set function 174 permits a user to select an initial reference object and determine its location with reference to the plurality of data points. For a planar reference object, a user can select an equation for a plane that exists above, below or within the plurality of data points depending on user preference. For a spherical reference object, the user typically will select an equation for a unit sphere having a center point location within the cloud of points center of mass. Many different techniques are currently available and can be used to implement the functions of the set function 174. For example, the set function 174 can determine the equation for a planar reference object by a minimum sum of squares method. For a spherical reference object, the set function 174 can determine the sphere location by a fitting function which determines center of mass. In an exemplary embodiment, the user executes the set function 174 in a preprocessing step, such that during the mesh initiation process 130, the equation of the reference object and its shape is already determined. In such an embodiment, the set function 174 returns the predetermined values to step 172.

After obtaining a basic reference object, such as a unit sphere, the processor proceeds in step 182 to construct an initial mesh. The system can be configured in many different ways to construct an initial mesh. According to the teachings of the present invention, any initial 3 or 4 points such as on the first 3 or 4 points from the ordered list 143, can be used to construct the initial mesh. Randomly selected points are suitable. A selection of points which lie closest to the plane and bound the largest space projected on that plane is also a suitable criteria. In the exemplary embodiment, if the reference object is a plane the first two points chosen are those closest to the plane and the third is the furthest from the plane. For a spherical reference object, an exemplary embodiment selects four data points which most closely determine a tetrahedron of equilateral triangles. To select the points the processor examines data point values in the data point list 142 and when selecting the points will remove them from the ordered list 143. In an exemplary embodiment the initial points can be selected in a preprocessing step before the ordered list 143 is generated. The selection of the initial points is shown as step 177 in FIG. 7. Depending on the user selected reference object (e.g., plane or sphere) the computer creates an initial triangulation in the form of either a square (constructed from two triangles) or a tetrahedron (constructed from four triangles). A square is used for planar triangulations, tetrahedrons are used for spherical triangulations. Alternatively, when the plane is the reference object, the single triangle can be used as an initial triangulation. For a spherical reference object, an exemplary embodiment selects four data points which most closely determine a tetrahedron of equilateral triangles. The first three selected points create a triangle, which will be the first face of the mesh. The system creates a face 1 record and sets vertices #0, #1 and #2 to pointers which reference the X,Y,Z coordinates on the data point list 142.

Figure 8A:
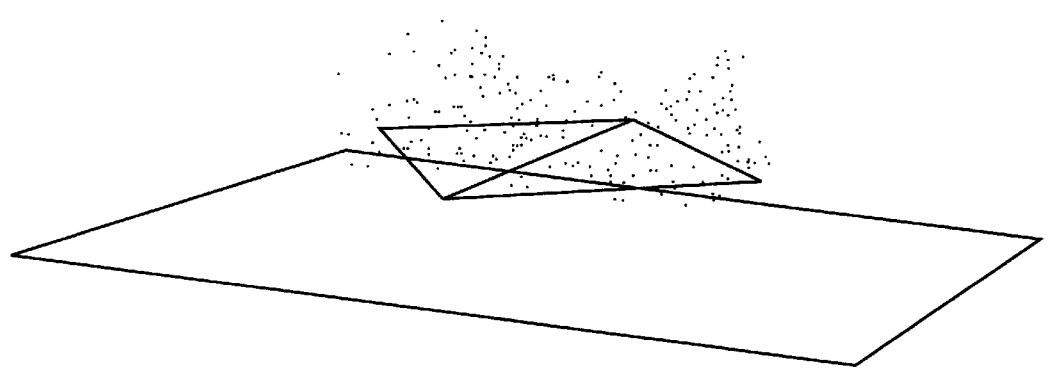
FIG. 8a Depicts an initial triangle mesh configuration made with reference to a plane.
Figure 8B:
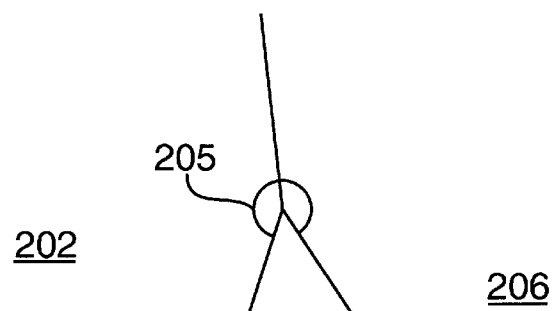
FIG. 8b Depicts an initial mesh configuration of one triangle made with reference to a plane.

FIG. 8 shows the two triangle initial mesh with a planar reference object. In an alternative environment, the planar space could be initially triangulated by just one triangle (as shown in FIG. 8). For the initial faces the system will also create neighbor face links. In both FIGS. 8a and 8b there is a region outside the boundary of the triangle region into which data points may be inserted. The present invention provides that the regions can be divided into null neighbor regions. For example in FIG. 8b the present invention divides the unbounded region into three null neighbor areas 202, 204 and 206. The system divides the null neighbor regions by a line which bisects the angle formed at each edge vertex (e.g., angle 205). Each null neighbor region forms a plane determined by the two points at the mesh edge and a third point set at an infinite value.

Figure 8C:
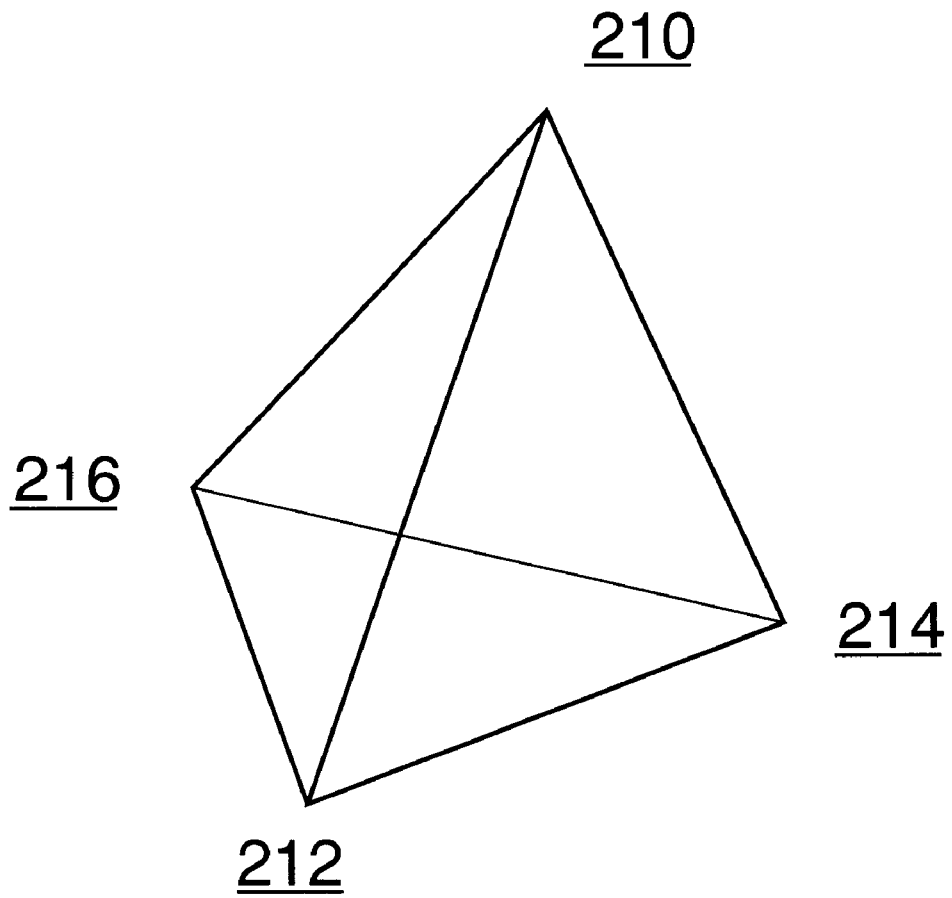
FIG. 8c Depicts an initial mesh configuration made with reference to a sphere.

If the initial reference is a sphere, FIG. 8c shows that the initial mesh constructed takes the form of a tetrahedron. In such a case, the mesh construction step of 182 (FIG. 8) creates a mesh with four faces using the four data points (e.g., 210, 212, 214 and 216). With the tetrahedron, each triangular face has as its neighbors the tetrahedron's other triangles. With the tetrahedron, it is not necessary to designate null neighbor regions as was the case with the planar triangulation determined above.

For each face record in either the planar or spherical example, the system orders the vertices and neighbors according to the counterclockwise structure described above with reference to FIG. 4. The processor in step 182 also checks the initial configuration for the Delaunay criteria and reorganizes the face edges as necessary.

v. Incremental Insertion of Data Points

Figure 9:
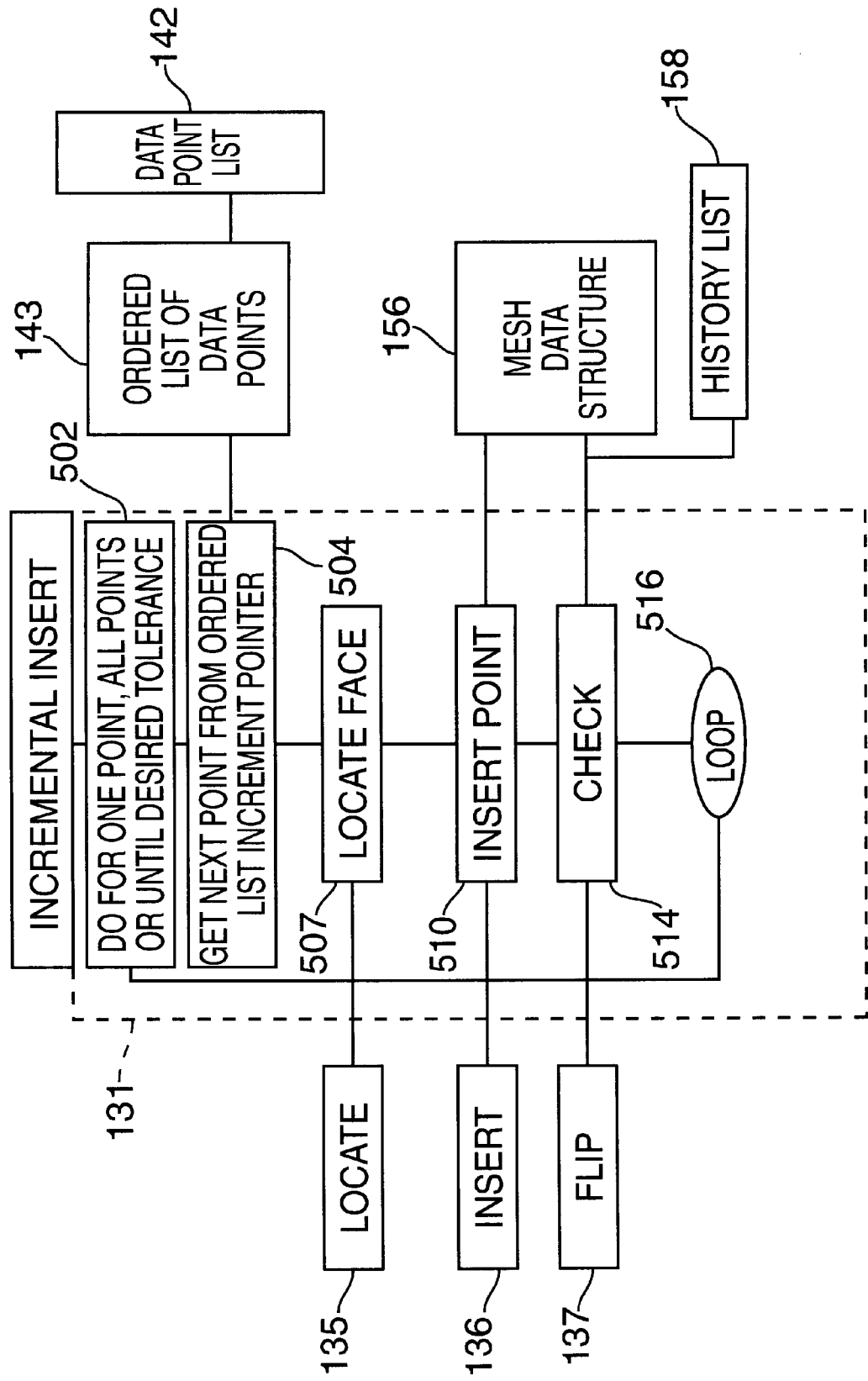
FIG. 9 Depicts an exemplary process flow for incremental insertion of one or more points.

FIG. 9 depicts an exemplary process flow for an incremental insertion of one or more of the remaining unmeshed points by the incremental insert procedure 131. Step 502 begins a loop which permits processing of, for example, one data point, all of the remaining unmeshed data points, or a set of data points up to a certain number. In step 504, processing begins by obtaining from the ordered list 143 the next point to insert. As seen above, the ordered list entry provides a pointer to the 3D X,Y,Z values for data points in the data point list 142. The next point inserted may cause the processor to make a number of adjustments to the mesh.

vi. Locating a Face in the Current Mesh

Figure 10A:
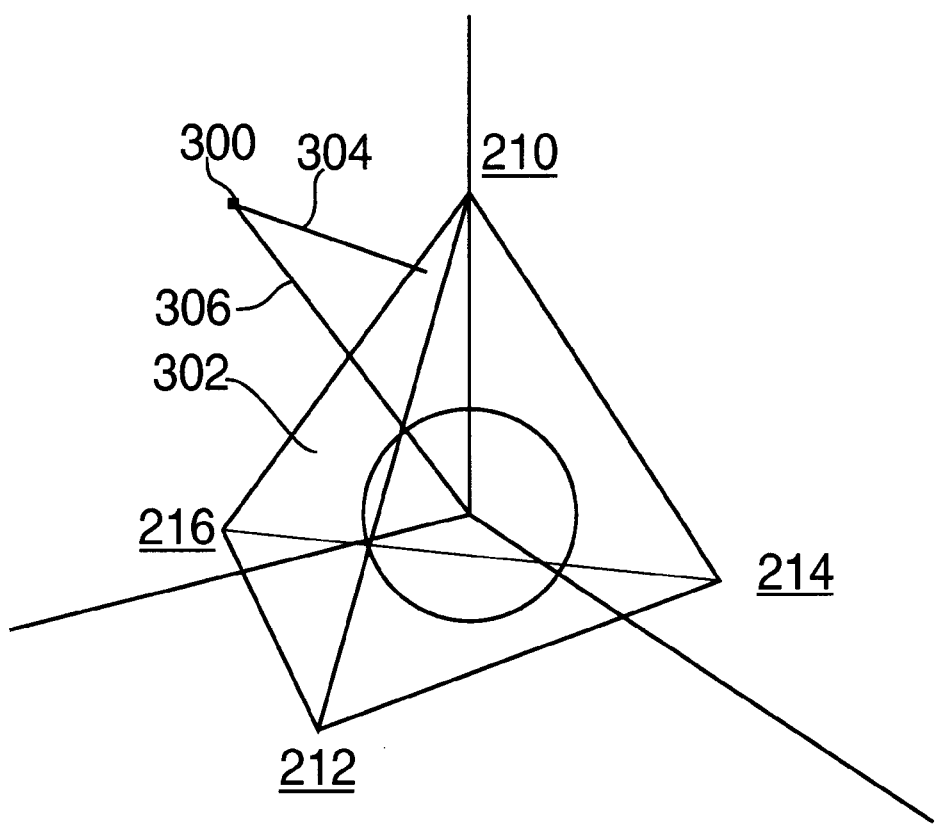
FIG. 10a Depicts a point and its shortest distance relationship between the point and the face of the mesh.

In step 507 the processor next locates a face (or edge location) on the existing mesh into which it will insert the next point. The locate function 135 (initially referenced in FIG. 3) provides a pointer or other reference to the face for insertion (or a reference to the closest face if the point will be inserted into a "null" region identified above). In an exemplary embodiment, the face returned has the shortest normal distance to the point. In an alternative embodiment, the face for insertion can be determined with reference to the shortest line from the point to the reference object which intersects the face. FIG. 10a depicts a point 300 and the distance relationships between it and face 302, as determined by a normal line 304 or an intersection line 306 from the reference object.

For purposes of implementing the present invention, many different procedures are suitable for determining the face (or location) of insertion. In the exemplary embodiment, the face location function 135 (FIG. 3) determines location based on proximity to the last acted upon face. The described system searches quickly by traversing a direct line of faces between the point to be inserted and the face for insertion.

Figure 11:
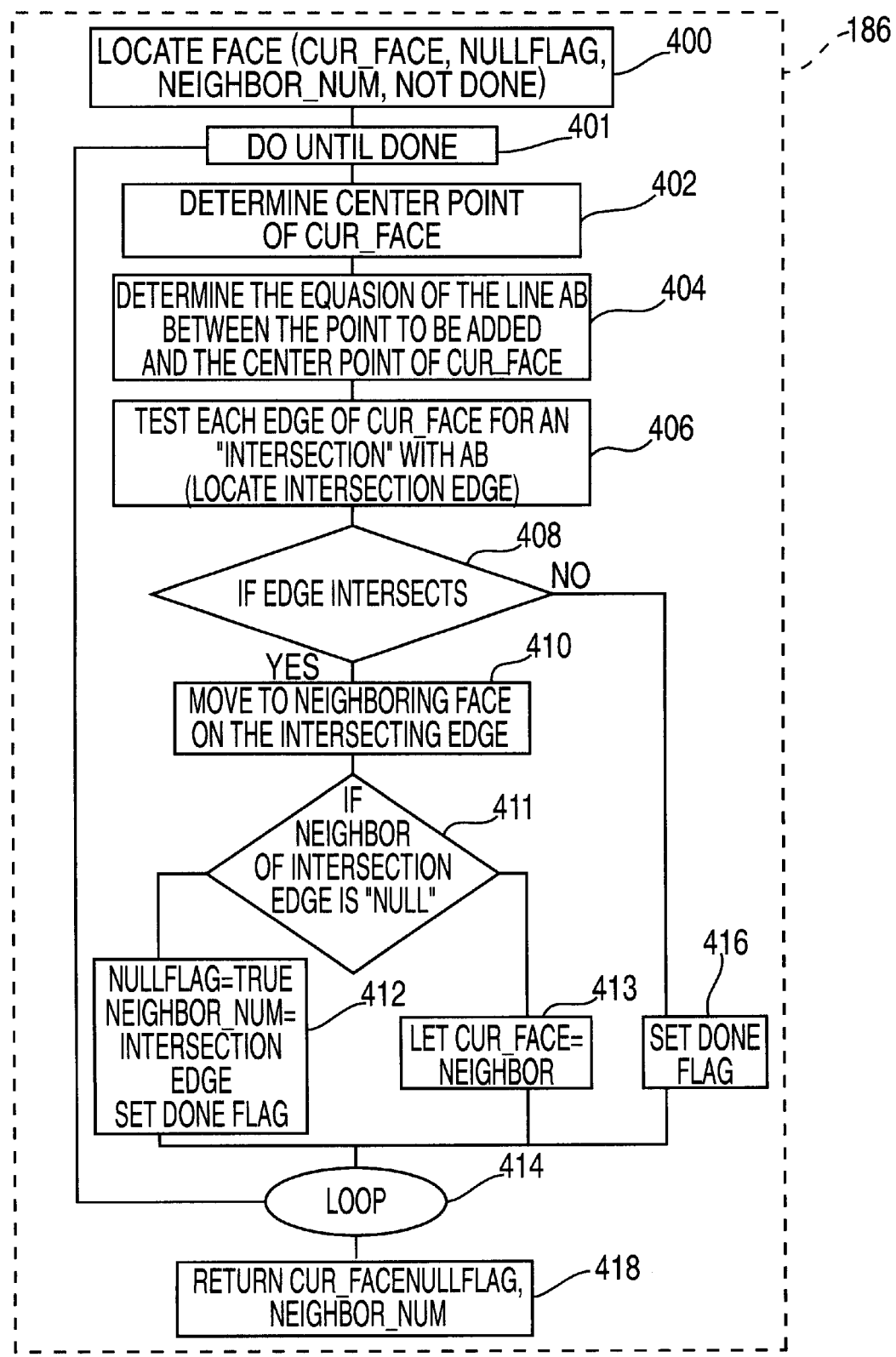
FIG. 11 Depicts an exemplary process flow of a locate function for determining the mesh face with which an unmeshed point will be associated.

FIG. 11 depicts an exemplary process flow of the locate function 135. In discussion of the exemplary process flow also the reader is also referred to FIG. 10b which depicts a representation of a mesh and shows how the face is located.

Referring to FIG. 11, the process flow begins in step 400 where the input is a pointer reference to the last face examined by the system (such as one of the faces of the initial mesh described above). That face is set to the "current face" and a loop begins in step 401 to determine whether the point to be added lies in that face. Referring to FIG. 10b, point 310 is the point to be added and the last face, triangle 312, is set to now be current face.

Referring to FIG. 11 the processor proceeds in step 402 to locate the center point of the current face (point 314 in FIG. 10b). In step 404 (FIG. 11), the procedure determines an equation for the line between points to be added (e.g., 310, FIG. 10b) and the center point of the triangle (e.g., 314). The line can be referred to as AB.

In step 406 of FIG. 11, the procedure then tests each edge of the current face (e.g., triangle 312, FIG. 10b) to determine whether the line AB will "intersect" one of the edges (i.e., cross one of the bounds of an edge of that triangle). The processor determines that intersection by projecting the mesh configuration and the AB line onto the reference object and determining whether an intersection occurs. In FIG. 10b, the line AB intersects edge 321 of triangle 312.

Referring to FIG. 11, step 408 provides that if there is an intersecting edge in the current triangle, the procedure will move to step 410 and examine the neighboring triangle that is adjacent to the intersecting edge. In FIG. 10b the neighboring triangle is triangle 319. However, in step 411 (FIG. 11) if the edge is "NULL" the procedure must take steps to handle that special case (which occurs when the surface is modeled in reference to a plane instead of a sphere). In step 412 the processor sets a null neighbor flag to indicate that the new point will not be inserted into an existing triangle. As the current face remains the closest triangle (even though the next point will not be inserted into it), the processor will also store the information about the triangle and set a DONE flag. If, in step 411, the neighbor is not "NULL" the processor simply resets the current face to be the neighbor in step 413. The process set forth in FIG. 11 continues in step 414 to loop and return to step 401 and perform the same checking procedure for the new triangle.

Referring to FIG. 10b the procedure continues checking in a typical case by locating center point 318 of triangle 319. The line AB is now drawn between points 310 and 318. The procedure checks the edges of triangle 319 and finds an intersecting edge 323. The procedure moves to neighboring triangle 325. In that triangle, the AB line defined by center point 322 and point 310 also intersects an edge. The process then continues to triangle 327, which is now the current face. For triangle 327, there is no edge which intersects between the line between center point 326 and point 310 (line 328). Referring again to FIG. 11, the result causes the processor to set a DONE flag in step 416 and exit the loop. In step 418, the processor returns a pointer to the found triangular face (or the special flags and pointers for the "NULL" case when a plane is the initial reference object as noted above).

vii. Inserting the Next Point

Figure 12A:
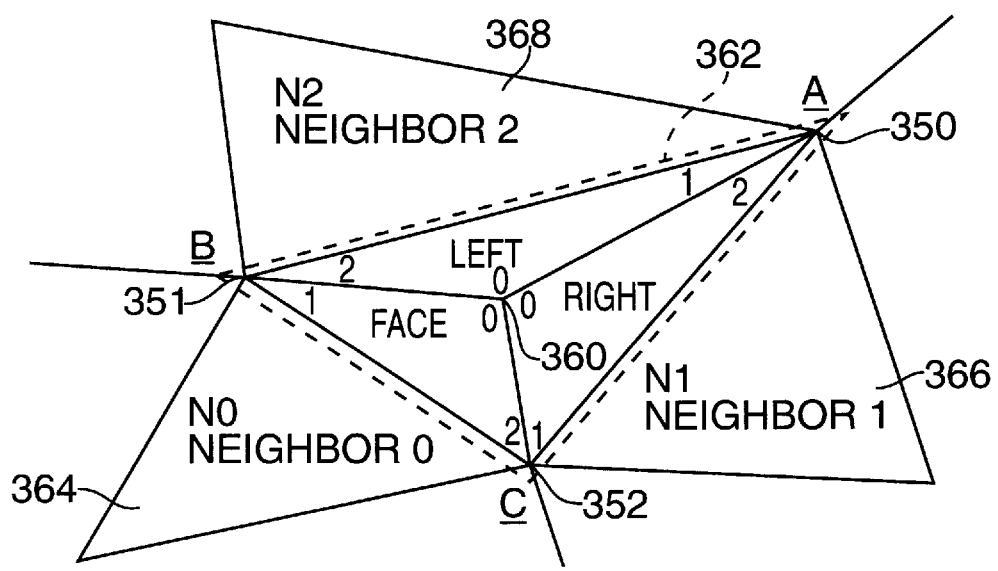
FIG. 12a Depicts the reorganizing of the relationship of vertices and neighbors of mesh faces when inserting a new point into a mesh.

Referring again to FIG. 9, the processor in step 510 adds the point to the mesh at the face (or edge) location found by the locate function 135 by invoking the insert point function 136. FIG. 12a depicts an addition of point 360 to triangular face 362 ("FACE") and shows the alteration of the face, vertices and neighbor relationships that the addition requires. Before the addition of point 360, triangle 362 with vertex points A, B and C (points 350, 351 and 352 ordered counterclockwise) carried the following relationships in its face data structure record:

Record: "FACE" (Triangle 362)

| | |
|---|---|
| NEIGHBORS: | Neighbor 0 (Triangle 364), Neighbor 1 (Triangle 366), Neighbor 2 (Triangle 368) |
| VERTICES: | V0 (point 350), V1 (point 351), V2 (point 352) |

Adding point 360 requires changes to the data structure links. The addition creates two additional faces: a RIGHT face (with vertices 360, 350, 352) and a LEFT face (with vertices 360, 350 and 351).

The original triangle "FACE" no longer has as its Vertex 0 at point 350. The processor sets vertex 0 for FACE to point 360. The new, smaller triangle has as vertices points 360, 351 and 352. The links to Neighbor 1 (triangle 366) and Neighbor 2 (triangle 360) also must be changed, because these triangles are no longer neighbors FACE. The process will first change FACE's neighbor link from "Neighbor 2" to "LEFT". The processor will also change FACE's from "Neighbor 1" to "RIGHT." The data structure for the revised FACE will appear as follows:

Record: "FACE"

| | |
|---|---|
| NEIGHBORS: | Neighbor 0, RIGHT, LEFT |
| VERTICES: | V0 (new point 360), V1 (point 351), V2 (point 352) |

The system creates new faces records, RIGHT and LEFT, as follows:

Record: "RIGHT"

| | |
|---|---|
| NEIGHBORS: | Neighbor 1, LEFT, FACE |
| VERTICES: | V0 (new point 360), V1 (point 352), V2 (point 350) |

Record: "LEFT"

| | |
|---|---|
| NEIGHBORS: | Neighbor 2, FACE, RIGHT |
| VERTICES: | V0 (new point 360), V1 (point 350), V2 (point 351) |

The processor also replaces Neighbor 1 (triangle 366)'s neighbor link to FACE with a link to RIGHT. The processor finds the line to FACE by searching each of NEIGHBOR 1's neighbor links until it finds the one that points to FACE. The processor replaces Neighbor 2 (triangle 368)'s neighbor link to FACE with a link to LEFT in the same manner.

This configuration has particular advantages, because it guarantees that the new vertex is always V0 for each face.

Also, since each vertex corresponds to an opposite edge and neighbor, the ordering creates a way to check the configuration for optimality in a regularized way. First, the neighbor that will be checked for optimality will always be the side involving neighbor 0. Furthermore, the indexing system guarantees that, by repeatedly moving toward "Neighbor 1" of each face, the system will circle around all the faces containing the new point and will eventually get back to the original face. Thus, the indexing creates a way to make a complete optimality check.

viii. Checking for Optimality of Mesh Quality

Figure 12B:
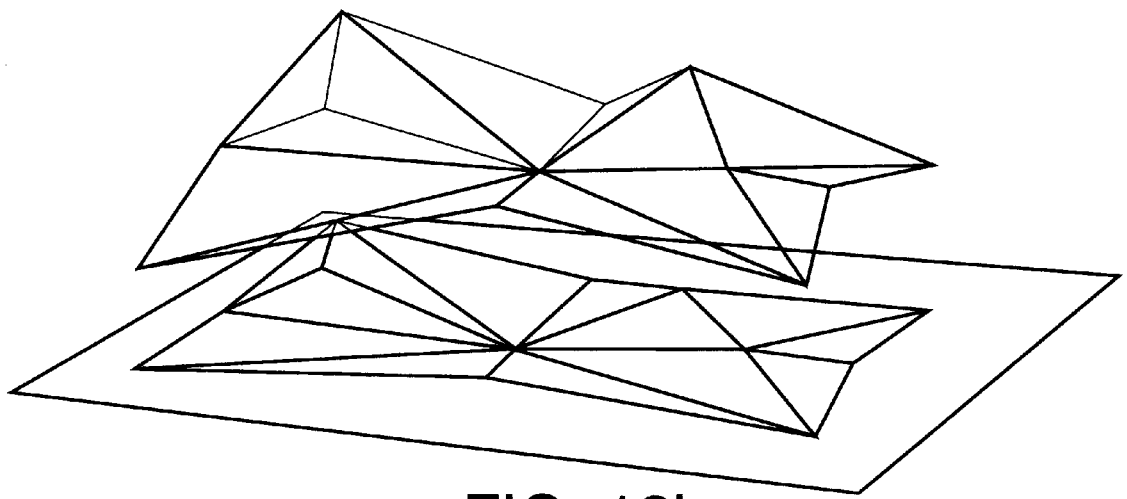
FIG. 12b Depicts a mesh construction projected on to a reference object that is a plane.
Figure 12C:
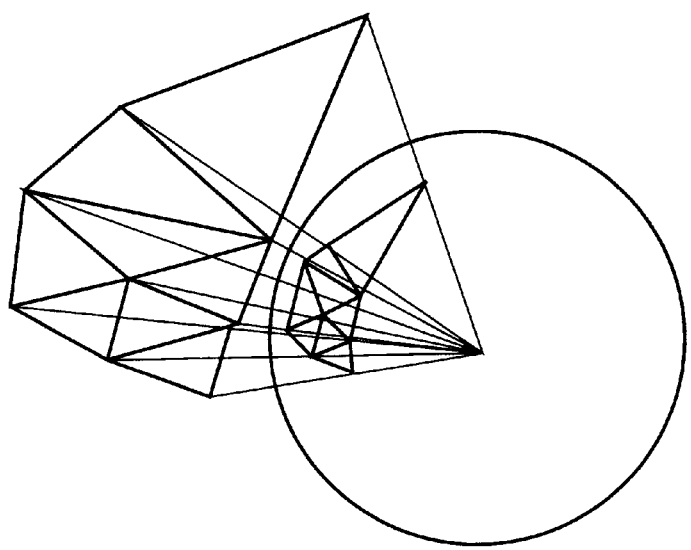
FIG. 12c Depicts a mesh construction projected on to a reference object that is a sphere.

Referring again to FIG. 9, incremental mesh building proceeds in step 514 to check the new point addition for optimality, re-organizing the mesh if the configuration created with the new point is not optimal in quality. In an exemplary embodiment, the optimal quality principle to be followed is the principle of Delaunay triangulation. To implement a Delaunay triangulation check the present invention projects the data point values in the mesh and 3D mesh configuration on to the initial reference object. FIG. 12b depicts a mesh construction projected on to a reference plane. FIG. 12c depicts a mesh construction projected on to a unit sphere. The present invention provides that the calculations for Delaunayian circumcircles and intersections shall be made with reference to those projected coordinates.

Figure 12D:
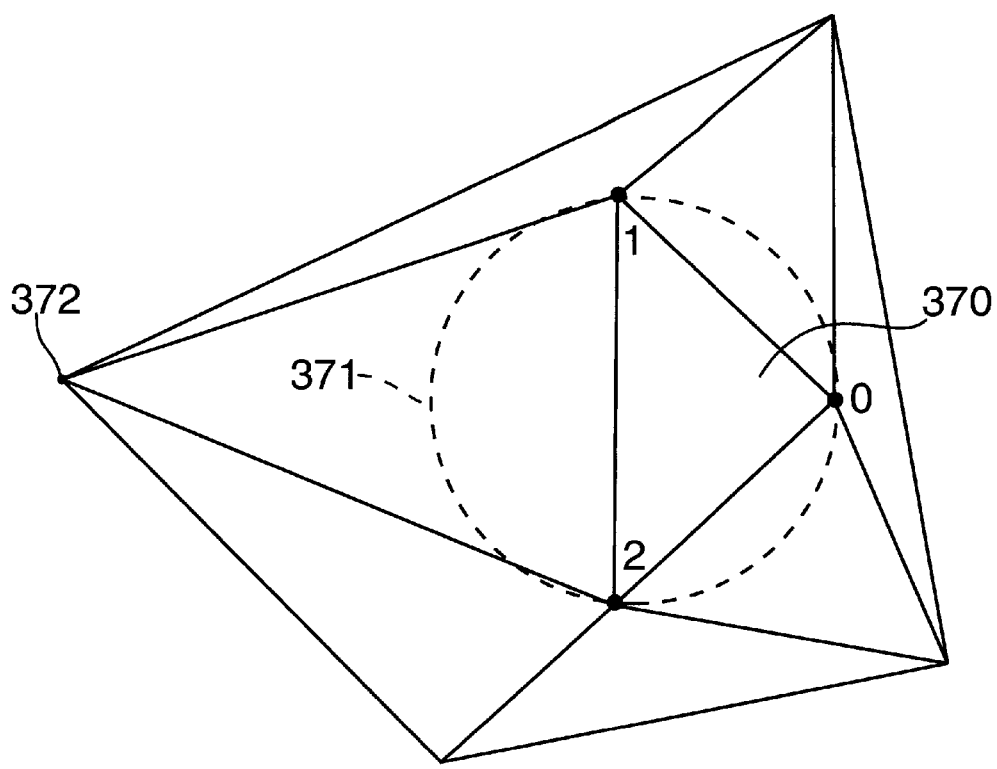
FIG. 12d Depicts two triangles checked for optimization.
Figure 12E:
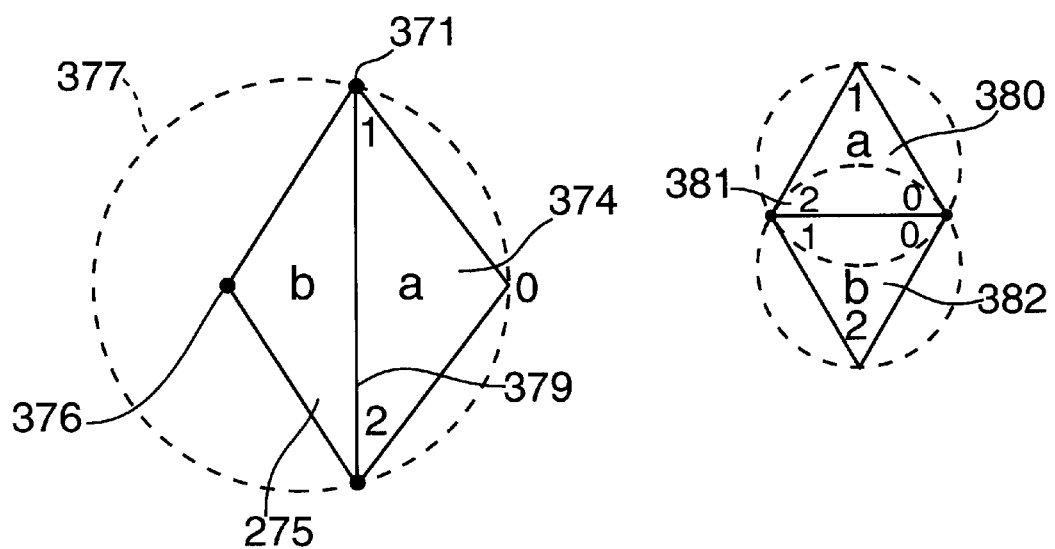
FIG. 12e Depicts a two triangle configuration where the triangles must be flipped.

FIGS. 12d–e depict the basic optimization principle of Delaunay triangulation as implemented in the present invention. For a triangle, e.g., triangle 370 in FIG. 12d, Delaunay principles hold that a circumcircle described by the three vertices of the triangle will not contain any other points of the mesh. In FIG. 12d, circumcircle 371 circumscribes no other point, such as point 372. Hence, triangle 370 is optimal by Delaunay principles.

FIG. 12e, on the other hand, depicts a triangle configuration (between triangle 374 and 375) that is not optimal and requires "flipping." As shown, circumcircle 377 for triangle 374 bounds point 376. In such a case, Delaunay principles hold that edge 379 must be flipped to create new edge 381 (as shown) and two new triangles 380 and 382. In creating the new configuration after point insertion, it may be necessary to make many flips while checking the resulting triangles for optimality. The present invention speeds the flipping process by creating a predetermined order to the checking and flipping.

Referring again to FIG. 9, the insert procedure 131 executes at step 514 a procedure to check all triangles in the region of the insertion point for optimality. The basic procedure of this step is to check the triangles to determine whether they should be flipped. For each triangle tested, the processor in step 514 makes a call to a basic flip function 137 which tests a triangle, executes a flip if necessary and returns a yes/no flag showing whether it executed a flip.

Figure 13:
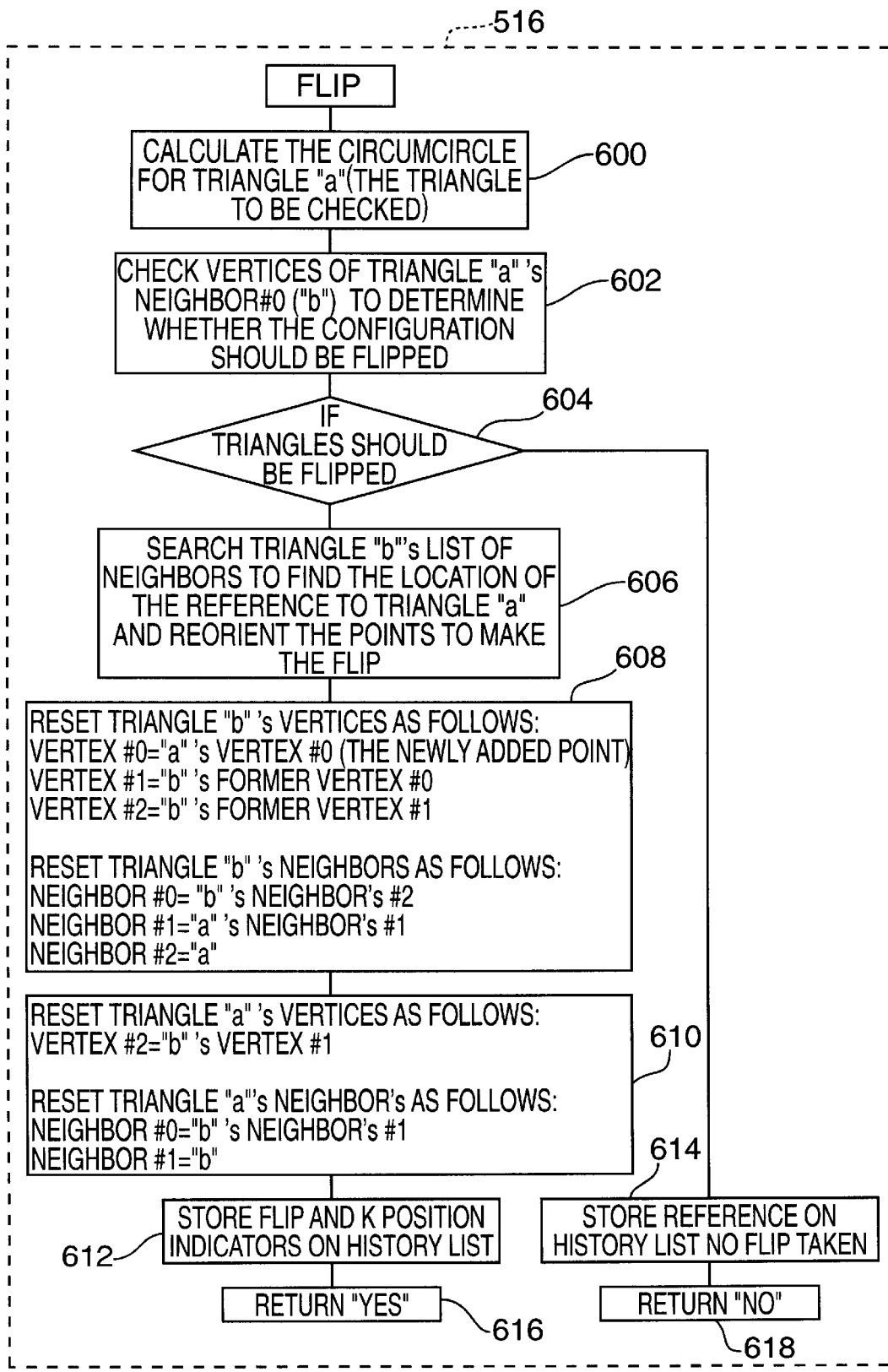
FIG. 13 Depicts an exemplary process flow for switching an edge between two triangles when a flip occurs.

FIG. 13 depicts an exemplary process flow for exchanging a link for two triangles when a flip might occur. This is the execution of the flip function 516. In this discussion, reference is also made again to FIG. 12e which shows exchange of links in the mesh as the flip occurs. Referring to FIG. 12e, the procedure operates to check triangle "a", 374. Neighbor #0 of triangle "a" is triangle "b", 375.

Referring to the procedure of FIG. 13, the processor in step 600 proceeds to calculate a circumcircle (e.g., 377, FIG. 12e) for the triangle in question, e.g., Triangle "a". In an exemplary embodiment, the system calculates and stores the circumcircle equation for use in later checking procedures. This circumcircle equation can be reused until the triangle is altered by a point insertion or flipping. The storage of the equation provides additional processing speed. In step 602, the processor checks to insure that the vertices of Neighbor 0 (Triangle "b") do not fall within the circumcircle 377. If the points do fall within, the processor in step 604 determines that the edges of the triangles must be flipped.

Figure 12F:
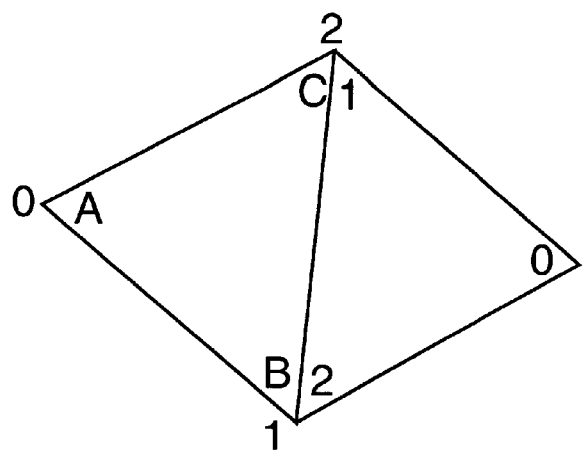
FIGS. 12f–h Depicts possible vertex relationships between a triangle being checked and a neighbor.
Figure 12G:
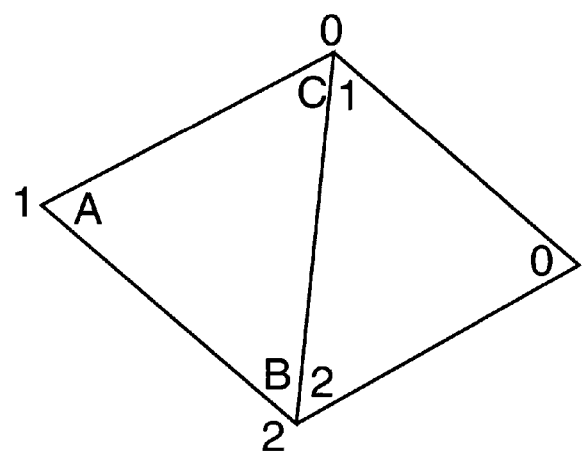
Figure 12H:
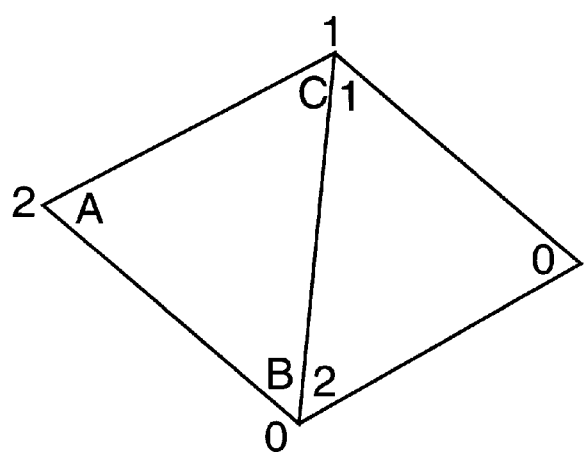

In step 606 of FIG. 13, the processor performs an adjustment to the face record for Triangle "b". The processor maintains the counterclockwise ordering of the triangles, vertices and neighbors, but realigns the vertices so that the point bounded by the circumcircle, e.g., point 376, FIG. 12e will be in the Vertex 0 slot and Triangle "a" will be in the Neighbor 0 data slot of Triangle "b". FIG. 12f depicts the desired alignment between the Triangles "a'" and "b". However, it is possible at the outset that the alignment between the triangles may have a different vertex ordering, such as shown in FIGS. 12g and 12h.

To reorient the vertices and neighbors, the processor first searches Triangle "b"'s neighbor list for the position of Triangle "a". For example, in FIG. 12g Triangle "a" would be in the Neighbor 1 slot opposite Vertex 1. In FIG. 12h, Triangle "a" would be in the Neighbor 2 slot opposite Vertex 2. The position of Triangle "a" in Triangle "b"'s neighbor list is represented by a variable, k such that Triangle "b" (Neighbor #k)=Triangle "a". Having located the k position, the processor in an exemplary embodiment reorients the face data structure for Triangle "b" as follows for the vertices. First, the processor sets the Vertex k slot to the data point reference found in the Vertex (3–k) slot of triangle b. Second, the processor sets the Vertex (3–k) slot to the data point reference found in the Vertex 0 slot of triangle b. Third, the processor sets the vertex #0 slot to the initial data point reference found in the Vertex k slot.

The neighbor references must also now be realigned to match the vertices as follows. First, the processor sets the Neighbor #k slot of Triangle "b" (originally a reference to Triangle "a") to the triangle face reference found in the neighbor (3–k) slot. The processor next sets the Neighbor (3–k) slot to the face reference contained in the Neighbor 0 slot of Triangle "b". Third, the processor sets the Neighbor 0 slot to a reference to Triangle "a" with the vertices and neighbors of Triangle "b". Readjusted, the two triangles will have the vertex alignment as shown in FIG. 12f.

Referring again to FIG. 13, the processor, after the realignment process of step 606, proceeds to execute the flip in step 608 and 610. In step 608, the processor reorganizes the vertices of (newly aligned) Triangle "b" as follows:

Vertex 0=Triangle "a"'s Vertex 0 (i.e., the newly added point)

Vertex 1=Triangle "b"'s Vertex 0

Vertex 2=Triangle "b"'s Vertex 1

In addition, the processor reorders the neighbor for Triangle "b" in step 608 as follows:

Neighbor 0="b"'s Neighbor 2

Neighbor 1="a"'s Neighbor 1

Neighbor 2=Triangle "a"

In addition, the processor in step 610 executes changes to the data structure to triangle "a". The Vertex 2 slot in Triangle "a"'s data structure is set to Triangle "b"'s Vertex 1. The Neighbor 1 link in Triangle "a" is replaced with a new link to Triangle "b". Also, "a"'s Neighbor 0 slot is now set to point to "b"'s former Neighbor 1.

With these changes the flip is complete and the former Triangle "a" and "b" 374, 375 in FIG. 12e are now redefined as triangles "a" and "b", 380 and 382. This invention teaches that the reorganization procedure in flipping preserves the setup and new point relationship created by the above described insert point procedure. In steps 616 and 618 the processor stores a reference to the outcome of the check on the history list (as shown below with reference to FIG. 14) and returns from the checking function.

ix. Checking All Triangles

With the flip function 137 described above the present invention can check all mesh faces that might be effected in point insertion. When a new point is added the new triangle configuration may need to be reorganized by flipping to maintain Delaunay optimality. In addition, the newly flipped triangles may require additional flipping to keep a state of optimality in relation to other neighbors. Referring back to FIG. 9, in step 514 the processor executes a systematic checking procedure when a new point is added.

FIGS. 14a–j depict an exemplary execution of a neighbor region checking procedure for step 514. The present invention provides a rigid checking sequence. In the exemplary embodiment, the history list has two bit value slots for history indicators as follows:

00=no flip
01=flip where the k value is the first slot
10=flip where the k value is the second slot
11=flip where the k value is the third slot It is understood, however, that other flip history list configurations are suitable. The rigid sequence permits the history list 158 to be created with little data overhead. The rigid checking sequence also provides that the flips made during checking can be later regenerated following the history list. In the exemplary embodiment, the checking procedure works in a counterclockwise direction from an initial, "home face" triangle.

Figure 14A:
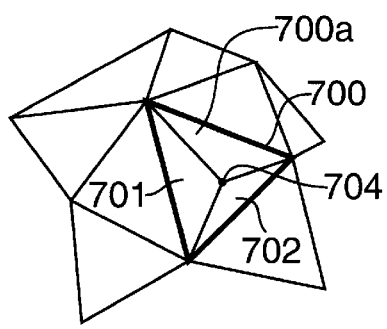
FIGS. 14a–j Depicts an exemplary execution of a neighborhood checking procedure.
Figure 14A:
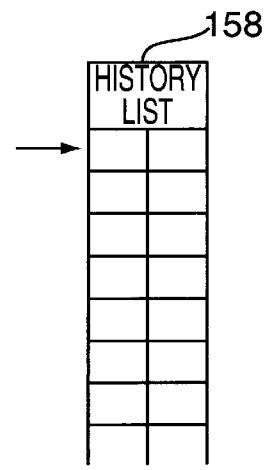
Figure 14B:
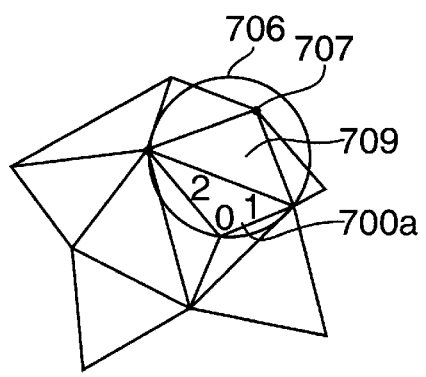
Figure 14B:
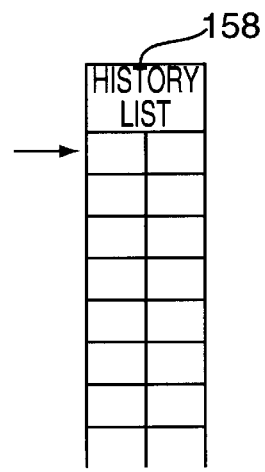

In FIG. 14a, the system inserts point 704 into triangle 700. The insertion splits triangle 700 into three smaller subtriangles 700a, the revised face of triangle 700, triangle 701, the new right neighbor face of triangle 700a, and triangle 702, the new left neighbor of triangle 700a. As can be seen, the history list 158 is blank as the insertion has required no revision. Checking for optimality begins with revised face 700a, the "home face." In FIG. 14b, 706 depicts a circumcircle created from the vertices of triangle 700a. As circumcircle 706 includes point 707, the triangle configuration is not optimal because it does not adhere to Delaunay principles. A flip must occur.

Figure 14C:
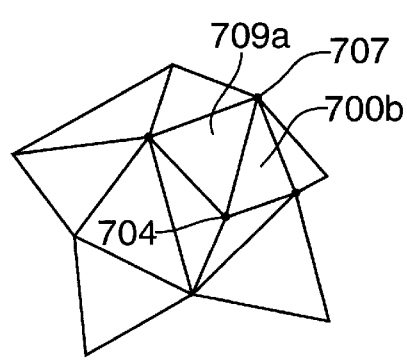
Figure 14C:
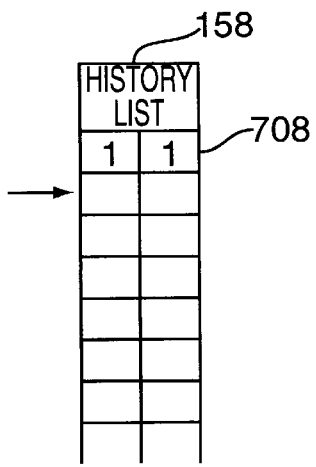

FIG. 14c shows the results of the flip procedure (described above). A new edge has been constructed between points 704 and 707, replacing the original point 1–2 edge of triangle 700. As described above, the processor revises triangle 700a to form triangle 700b. Triangle 709a is the revised form of triangle 709. The flip function (516, FIG. 10) returns a "YES" value to indicate that a flip occurred. The flip function 516 also marks the flip by inserting a value, such as the "11" value placed on the history list 158 at position 708 and augmenting the stack pointer.

Figure 14D:
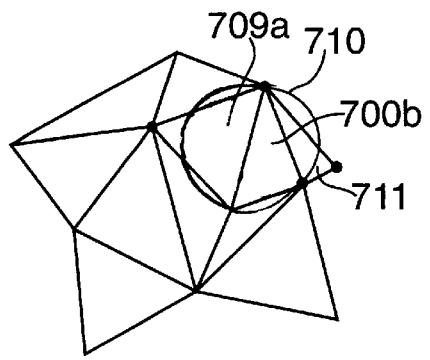
Figure 14D:
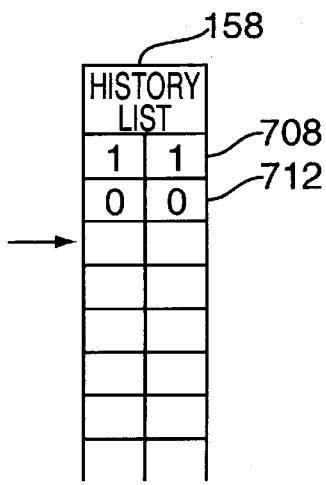

The triangles created by the flip will also require checking. Of the two triangles created, the procedure will remain on triangle 700 (now 700b) and create circumcircle 710 from its vertices and check triangle 700b against triangle 711. That circumcircle is depicted in FIG. 14d. As triangle 700b is optimal, the checking procedure moves in a counterclockwise direction to triangle 709a. Before moving, the processor writes an indication of the result of the second check ("00") on the history list 158 (at position 712) and augments the pointer.

Figure 14E:
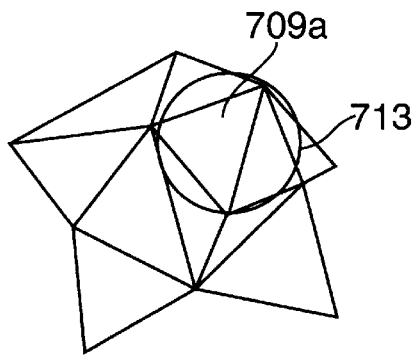
Figure 14E:
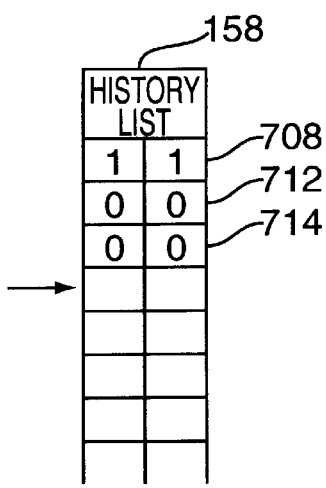

FIG. 14e depicts the check of triangle 709a. Circumcircle 713 shows that it bounds no points other than the vertices of the triangles, thus it is considered optimal in the exemplary embodiment. As the flip function (516, FIG. 10) returns a "NO" indication, the processor makes an indication of this result ("00") on the history list 158 (at position 714) and continues in a counterclockwise direction to the next neighboring triangle.

It is noted that the present invention's indexing system for faces, neighbors and vertices creates an easy way for counterclockwise (or clockwise) movement through the neighboring faces. The indexing system ensures that after insertion and during flipping the selection of neighbor #1 will always access the next face in counterclockwise direction. (The invention can also be configured for clockwise movement by, for example, reversing the index order of points and neighbors.)

Figure 14F:
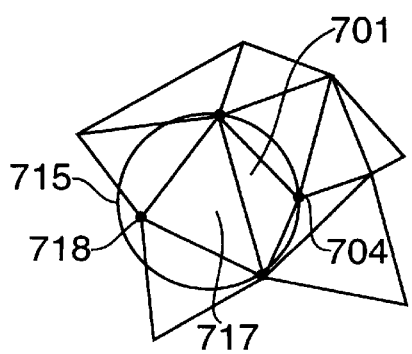
Figure 14F:
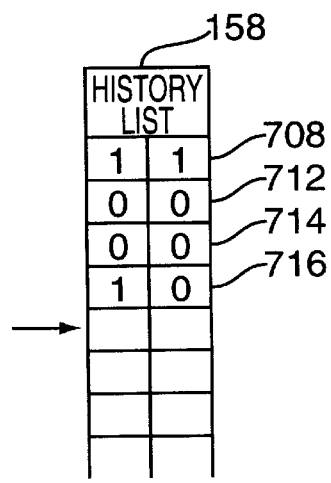
Figure 14G:
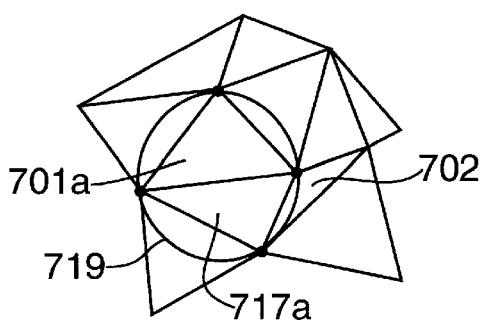

Following the counterclockwise movement, FIG. 14f depicts the checking procedure re-executed on the next triangle 701. Triangle 701 was one of the new triangles created upon insertion of point 704. When the system executes the flip routine, circumcircle 715 shows that point 718 of triangle 717 lies within its bounds. Such a configuration is not optimal and requires flipping. The flip function returns a "YES" indicator (e.g., 10 when the k value is the second slot) which is stored on the history list 158 (at location 716). The flip revises triangles 701 and 717 into flipped triangles 701a and 717a (FIG. 14g).

With the flip, the system must recheck triangle 701 a. FIG. 14g depicts that check. In the call to the flip (516, FIG. 10), circumcircle 719 shows that it bounds no extraneous points. Hence, it is an optimal configuration. The flip function 516 returns a "NO" indicator and stores an indication ("00") at location 720 on history list 158.

Figure 14H:
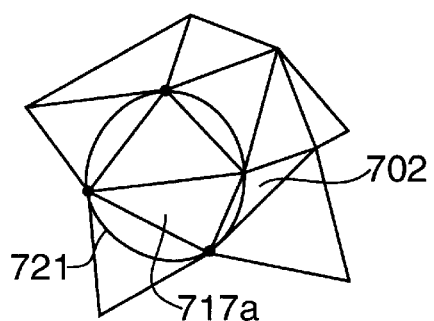

The checking routine continues in a counterclockwise direction to the revised triangle 717a. FIG. 14h shows circumcircle 721 computed from triangle 717a's vertices. The circumcircle shows that the triangle is optimal, and the flip function 516 writes a "NO" indicator ("00") to a location 722 on the history list. Checking moves in a counterclockwise direction to triangle 702.

Figure 14I:
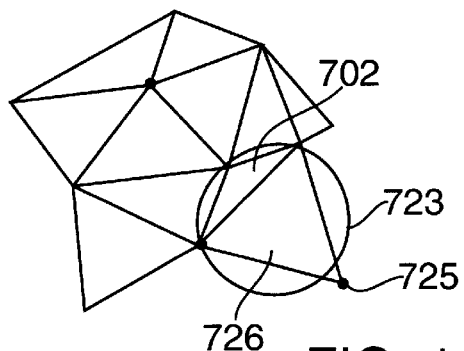

FIG. 14i depicts an optimality check on triangle 702. Circumcircle 723 shows that point 725 of triangle 726 lies outside and is not bounded. Consequently, the flip test for the triangle will return a "NO". In position 724, the flip function 516 enters an indicator ("00") for the negative result, and moves counterclockwise to the next triangle, 700b.

Figure 14J:
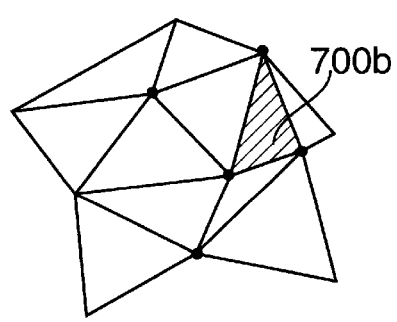

In FIG. 14j, triangle 700b is the face where the checking procedure began. The present invention provides that upon reaching the starting or home face in any neighborhood check the system can cease checking because the system has checked all triangles within the region of the insertion point for optimality.

Figure 15:
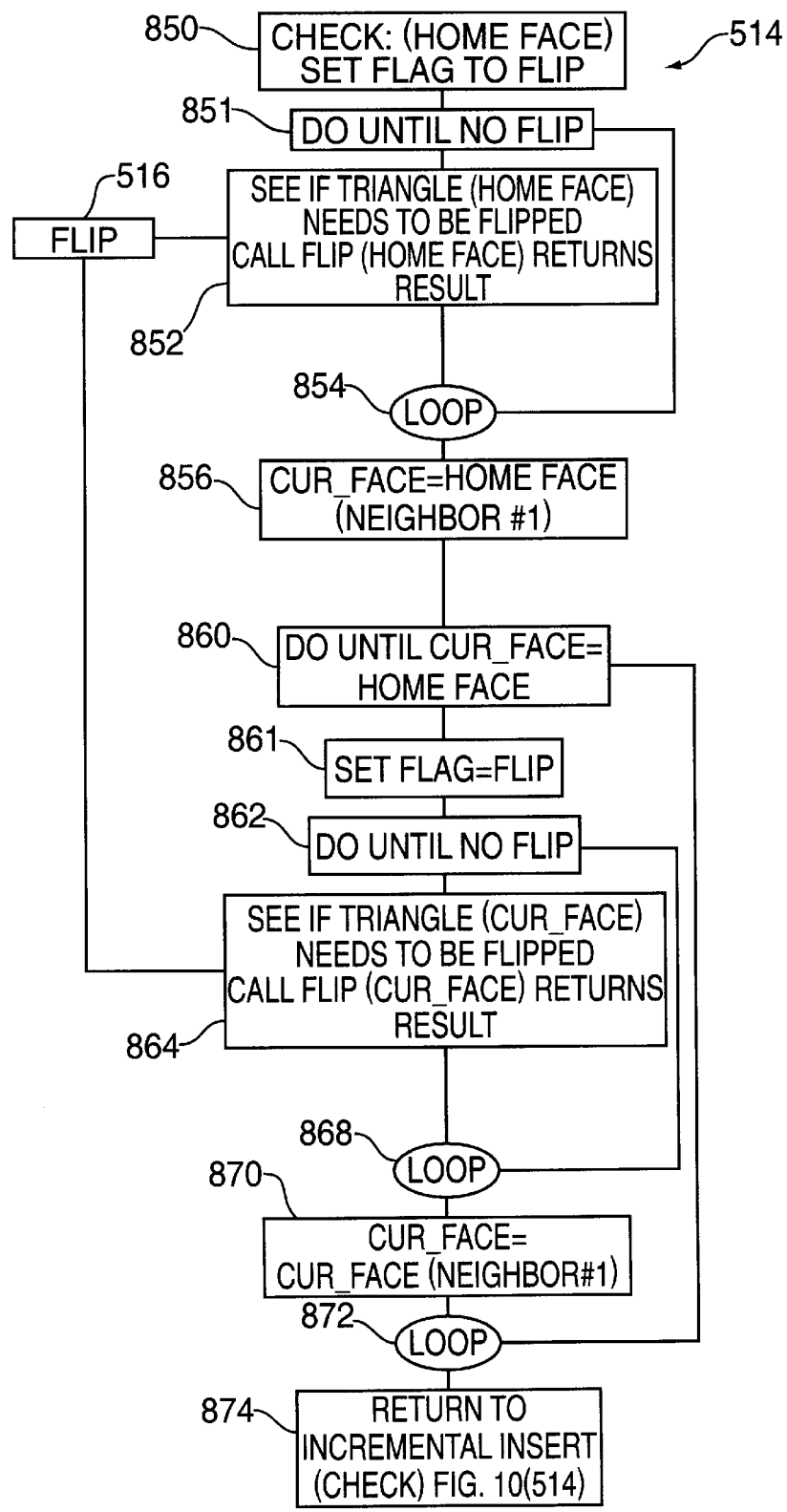
FIG. 15 Depicts an exemplary process flow for a neighborhood checking procedure according to the present invention.

FIG. 15 depicts an exemplary process flow for the checking procedure described above and referenced in step 514 of FIG. 9. Referring to FIG. 15, step 850 receives input: a pointer to the face, the home face, which must be checked. The check will proceed in a specific, (e.g. counterclockwise) direction about the neighborhood of triangles. The checking procedure begins and ends at the home face.

In step 851, the processor begins a loop to check the home face triangle until it needs no flipping. In step 852, the processor first checks the home face to see if it is optimal as revised (e.g., see triangle 700a in FIG. 14b). The flip function 516, called in step 852, calculates a circumcircle for the triangle in question and then determines if the remaining vertex in the Neighbor 0 triangle (i.e. the triangle opposite the newly inserted point) lies within the circle. (This is the procedure described above with reference to FIG. 13.) If the remaining vertex does not lie within that boundary, the triangle passes the optimality test, because by Delaunay principles, it is optimal. On passing the test, the flip function 516 returns a "FLIP" or "NO FLIP" indicator, such as a boolean flag set to "1" or "0."

However, if the triangle in question fails the test, the edge joining the triangle in question and its opposite must be flipped. (The procedure for flipping this edge was described above with reference to FIG. 13.) If a flip is required, the flip procedure manages the face records in the mesh data structure 156 (FIG. 3), adds the reference to the history list 158 (FIG. 3) and returns a "FLIP" indicator to the checking procedure in step 852. If a flip has occurred, the home face must again be rechecked for optimality because it has been revised. In step 854, the processor loops to step 851 and continues checking the home face until it is optimal. When the home face has been optimized (e.g. there was no flip), the processor moves to step 856 and sets a current face to equal the next clockwise face in the order of checking. In the exemplary embodiment, that face is Neighbor 1 of the current face.

Step 860 begins a loop to check the remaining faces in counter-clockwise order. In step 861, a FLIP flag is reset. A secondary loop begins in step 862 to check each neighboring triangle until it requires no more flipping. Step 864 calls the flip function 516, which calculates a circumcircle using the vertices of the face in question, tests the remaining vertex in Neighbor 0 for optimality and writes to the history list 158 (FIG. 10) the results of flip. The flip function 516 also returns to the checking procedure an indication of whether a flip occurred: "FLIP" if a flip occurred; "NO FLIP" if the triangle is optimal. If the triangle was flipped it must be rechecked as described above. In step 868, the processor loops to step 862 which will continue checking the same triangle until it is optimal. Once the triangle checks, the processor moves to step 870 where the current face (the face in question) is reset to be the next counter-clockwise face. In step 872, the processor loops to step 860 to begin the checking procedure for the next triangle. If, in step 860, the current face is the home face then the checking procedure has come full circle. It is now known that the mesh is optimal as all triangles pass the Delaunay criteria. In step 874, the procedure completes and the processor returns to the insert procedure step 514 (FIG. 10) and the task of inserting the next point of most significant detail.

x. Resetting for Additional Point Insertions

Referring again to FIG. 9, the processor moves to insert additional data points after the point has been added and checked. In step 516, the processor loops to step 502 and continues until the insert procedure is complete, such as when all the data points on the ordered list 143 are inserted.

xi. Insertion of Points on the Edge of the Mesh

Referring again to FIG. 9, the incremental insert function in step 510 may have to insert a next point onto the edge of a mesh, rather than into a triangle, as described above. An edge insertion/addition occurs only in the case when creating a mesh with reference to an initial object that is a plane.

Figure 16A:
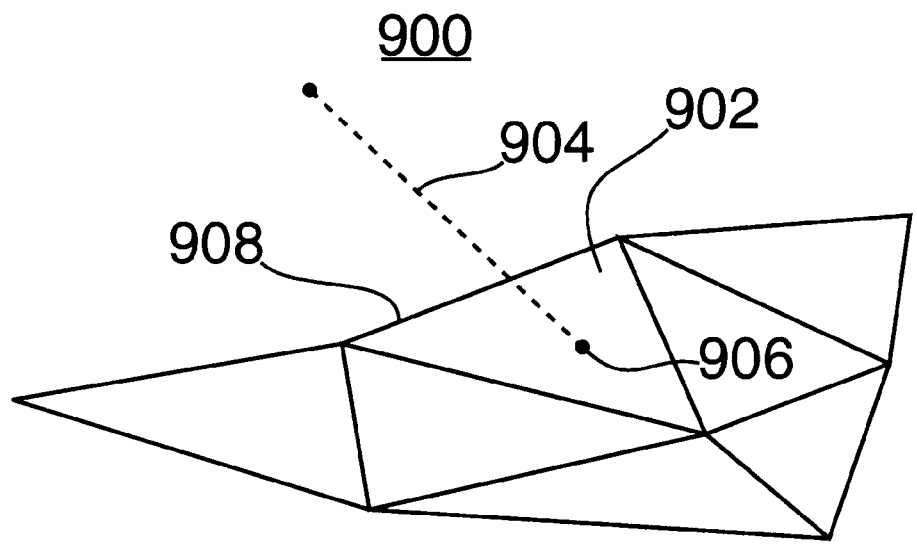
FIGS. 16a–b Depicts the process of adding a point to the edge of a planar mesh.

FIG. 16*a* depicts an edge insertion case. The discussion to follow describes how the insert point and checking steps 510 and 514, of the incremental mesh function, can be configured to handle an edge insertion. In FIG. 16*a*, point 900 was determined by the locate function 135 to be in a "null" area (an area outside of the space of the existing mesh). The locate function 135 determined that triangle 902 was the nearest triangle to point 900 and that AB line 904 (constructed from the center point 906 of triangle 902 to point 900) overlaps edge 908.

Figure 16B:
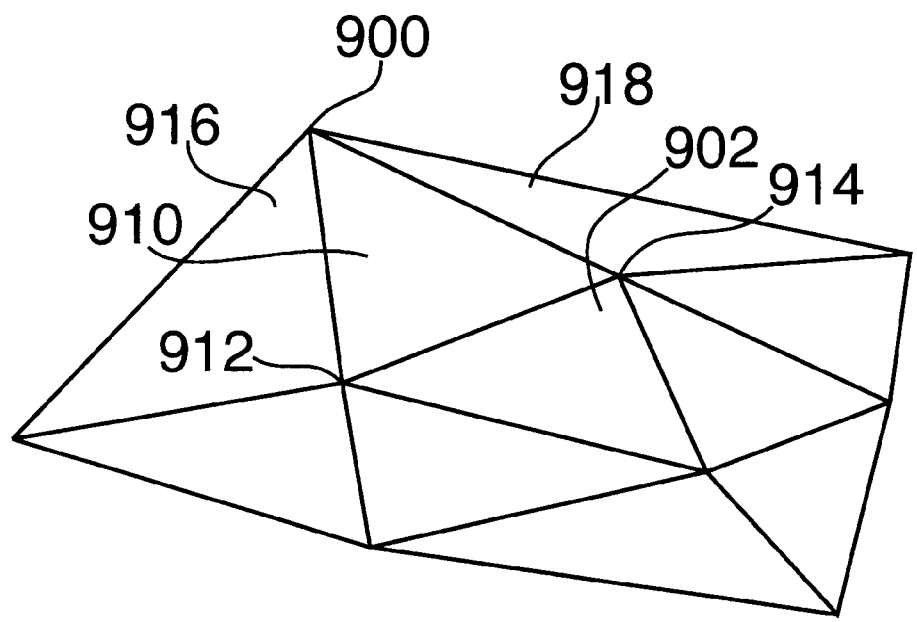

With this information, the incremental insert function 131 can create new face links to add point 900 into the mesh. FIG. 16*b* depicts the initial construction. The processor will create a new face triangle, 910 which will have as vertices points 900, 912 and 914. In triangle 902, the processor sets the null neighbor to now reference triangle 910. Triangle 910 also has as its neighbor #0, triangle 902. The processor will also examine the neighbor relationships of triangle 902 and its neighbors to also create additional triangles as neighbors to triangle 910, such 916 and 918.

xii. Use of the History File

The complete history of data point insertions from the initial mesh to full resolution can be computed in advance and then later used for even more rapid mesh generation. Such an additional use has advantages in applications such as computer games and other graphic applications, where the generation of objects and surfaces must occur at a rapid pace. For such applications, the computer system 3 of the present invention would be further configured to generate a complete, full detail history list for the object in question, before the application is used. The computer system 3 would store the set of data points, the history list 158, the data structures for the initial mesh (e.g., 156), and the ordered list of points 143 in the memory until the application required display of the mesh. During execution of the of the application, the computer can rapidly generate meshes, following the order of the insertion list and the history file.

The processor would access the data in those lists using pointers to scroll through the ordered list and history list. This use of the history list saves computation time in application. First as new points are added or removed from the mesh, distance values for the altered points would not have to be calculated. Second, use of the history list saves additional processing time because the computations in the sequence of checking steps to insure Delaunayian optimization would not have to be repeated.

The invention continues as described above. The above described embodiment of the invention is meant to be representative only, as certain changes may be made therein without departing from the clear teachings of the invention. Accordingly, reference should be made to the following claims which alone define the invention.

We claim:

1. A computer-based system for generation of an optimized mesh model of a three-dimensional object or surface, the computer, including a processor coupled to a memory and program elements, adapted to accept as input a plurality of data points, with each data point being a coordinate describing the object or surface to be modeled, and construct a mesh to model the object or surface, the system comprising:

(a) a data point detail element to order the plurality of data points into a sequence from first point to last point for insertion into the mesh model and storing the sequence of data points in an ordered list, the data point detail element ordering the plurality of data points such that each of the data points in the ordered list is a near neighbor to a next data point in the ordered list;

(b) a mesh model construction element to construct a mesh following the ordered list, the mesh comprising a plurality of faces, with each face being a geometric shape with a predetermined number of vertices, the face vertices being ones of the data points from the ordered list, the boundary connection between any two adjacent vertices of a face comprising an edge of the face, with a face being connected to another adjacent face in the mesh through a shared edge and shared vertices creating that shared edge, the mesh model construction element constructing the mesh by creating an initial mesh with the mesh model comprising of a plurality of faces;

(c) an optimality checking element to determine whether the construction of newly created faces as a result of construction, meets a predetermined optimality criteria and to redefine in a sequenced order the boundaries of the newly created faces when one of the newly created faces does not meet the predetermined optimality criteria; and (d) the optimality checking element further comprised to place an indication on a history list in sequence for each check or redefinition made for a particular face.

2. The system of claim 1, wherein the mesh construction element inserts data points starting from the first point of the ordered list and continues building the mesh with each succeeding point in sequence until the last point of the ordered list and the list is followed using a pointer.

3. The system of claim 1 where the optimality criteria is the Delaunay principle of optimality for an irregular triangulated mesh.

4. The system of claim 1 further comprising a mesh regeneration element where the mesh construction element inserts data points starting from the first point of the insert list and continues building the mesh with each succeeding point in sequence until last point of the ordered list and then regenerates the following the sequence of indications on the history list.

5. A computer-based system for generation of an optimized mesh model of a three-dimensional object or surface, the computer, including a processor coupled to a memory and program elements adapted to accept as input a plurality of data points, with each data point being a coordinate describing the object or surface to be modeled, and construct a mesh to model the object or surface, the system comprising:

(a) a data point ordering element to order the plurality of data points by subdividing the plurality of data points into partitions and continuing to subdivide until each partition contains a single data point and listing the data points in a sequence corresponding to the subdividing to create an ordered list where each point in the list is a near neighbor to the next point in the ordered list;

(b) a mesh model construction element to construct a mesh comprising at least one face using a subset of the plurality of data points, the mesh comprising a plurality of faces with each face being a geometric shape with a predetermined number of vertices, the face vertices being ones of the subset of data points, the boundary connection between any two adjacent vertices of a face comprising an edge of the face, with a face being connected to another adjacent, neighboring face in the mesh through a shared edge and shared vertices creating that shared edge;

(c) the mesh model construction element further adapted to further construct the mesh by inserting data points and making those insertions in a sequence following the ordered list, the mesh model construction selecting a data point from the ordered list for further building the mesh;

(d) a location element to identify the mesh face which is closest in distance to the data point from the ordered list;

(e) the mesh construction element to further construct the mesh by inserting the data point into the face identified by the location element, by rearranging the vertices of the face and including the data point for insertion to create a set of new faces with the data point for insertion being shared in each new face, the new faces being connected to other faces in the mesh through vertices and edges as were previously established in the insertion face, the processor establishing neighbor relationships for each new face and the point insertion element further adapted to advance the pointer to the next data point in the ordered list;

(f) an optimality checking element to check one of the newly created faces to determine whether its construction meets a predetermined optimality criteria, the checking procedure checking the new face and the neighbor face opposite the newly inserted data point to evaluate its vertex and edge configuration for optimality and reconfiguring the face being checked and the neighbor to redefine their boundaries when the newly created face does not meet the predetermined optimality procedure;

(g) a optimality checking element further comprised to place an indication of either a successful check or the rearrangement on a history list for this check;

(h) the optimality checking element further configured to check the all the newly created faces in a rotational direction moving from the location of the first checked face;

(i) a optimality checking element further comprised to place an indication of either a successful check or the rearrangement on a history list in succession as each subsequent check is executed; and (j) a mesh regeneration element further comprised to construct the complete mesh inserting all point following the sequence of the ordered list and checking to add indications to the history list, and thereafter regenerating the mesh using only the ordered list to insert points and the indications on the history list to make the data point insertions.

6. A computer-based system for generation of an optimized mesh model of a three-dimensional object or surface, the computer, including a processor coupled to a memory and program elements adapted to accept as input a plurality of data points, with each data point being a coordinate describing the object or surface to be modeled, and construct a mesh to model the object or surface, the system comprising:

(a) a data point detail element to order the plurality of data points by recursively subdividing the plurality of data points into partitions until each partition contains a single data point, ordering the partitions during the recursive subdivision, ordering the data points in a sequence corresponding to the order of the partitions containing the data points and storing this sequence of data points in an ordered list;

(b) a mesh model construction element to construct a mesh comprising of a plurality of triangular faces, the face vertices being ones of the data points from the ordered list, the vertices for each face being ordered sequentially to have first, second and third vertices with a boundary connection between any two adjacent vertices of a face comprising an edge of the face, with a face being connected to another adjacent, neighboring face in the mesh through a shared edge and shared vertices creating that shared edge, the neighbors of the face being ordered following a sequential order corresponding to the ordering of the face's vertices;

(c) the mesh model construction element further adapted to place a pointer to the data point on the ordered list that is next in sequence after the last data point used to construct a face, the pointer indicating the next data point for insertion into the mesh;

23

(d) a location element to determine the mesh face which is closest in distance to the next data point for insertion;

(e) a mesh insertion element, comprised to enable the processor to insert the next data point for insertion into the mesh by incorporating the data point for insertion and reorganizing the arrangement of vertices of the face that is closest in distance to the point for insertion (the insertion face) to create a set of three new triangles, each having its vertices ordered in a sequential manner with the data point for insertion being the first point in each new triangular face, the new triangles being connected to other triangles in the mesh through vertices and edges as were previously established in the insertion face, the new faces creating a continuous surface with the other faces of the mesh, the neighbors for each new face being ordered following the sequential order and corresponding to ordering of the face's vertices;

(f) an optimality checking element to enable the processor to check one of the newly created faces to determine whether their construction meets Delaunayian optimality criteria, by checking the newly created face with a neighbor triangle to determine whether the non-shared vertex of the neighbor lies within a circumcircle determined by the vertices of the newly created triangle and place an indication on a history list if the faces meet the Delaunayian optimality criteria;

(g) a rearrangement element to reconfigure the shared edge between the triangle being checked and the neighbor to create two new flipped triangles, if the combination does not pass Delaunayian optimality, the rearrangement element further comprised to place an indication of the flip on the history list as the next action;

(h) the optimality checking element further comprised to recheck the triangle previously being checked if it was rearranged, using the rearrangement element to flip and indicate the flip history, if the new configuration does not meet Delaunayian optimality;

(i) the optimality checking element further comprised to proceed to a neighbor of the triangle being checked according to a preselected sequence and perform a check for optimality;

j) the optimality checking element further comprised to proceed checking the first neighbor of all checked triangles until it arrives again to the first triangle checked; and (k) a mesh regeneration element which can reconstruct the complete mesh, after the complete mesh has been constructed at least once by having all data points inserted and all operations stored on the history list, by using only the ordered list to insert points and the associated operations stored in the history list for each data point insertion.

7. The system of claim 6 further comprising:

(a) the point insertion element, further comprised to enable the processor to insert the next data point for insertion into the mesh by rearranging the face for insertion by replacing the first vertex of that triangle with the data point for insertion, creating a new right neighbor triangle having the data point for insertion as a first vertex, the first face point as the second vertex and the second face point as the third vertex, and creating a new left face with the data point for insertion as the first vertex, the third face point as the second vertex and the first face point as the third vertex, the newly organized triangles being referred to as insertion face, left and right, and the processor configured to adjust the identification of neighboring triangles to follow the order of vertices; and (b) the optimality checking element further comprised with a flipping element to rearrange the shared edge between the triangle being checked and the first neighbor, if the combination does not pass Delaunayian optimality, the flipping element enabling the processor to rearrange the triangles by redefining the vertices for the first neighbor triangle by setting the first vertex to be the first vertex of the triangle being checked, setting the second vertex to be the first neighbor's former first vertex and setting the third vertex to be the first neighbor's former second vertex and redefining the vertices of the triangle being checked to change its third vertex to be the former first vertex of the first neighbor.

8. A system for generation of an optimized mesh model of a three-dimensional object or surface, the system adapted to accept as input a plurality of data points, with each data point being a coordinate describing the object or surface to be modeled, and construct a mesh to model the object or surface, the system comprising:

(a) means for ordering the plurality of data points into a sequence for insertion into the mesh model and storing the sequence of data points in an ordered list;

(b) means for construct a mesh comprising of a plurality of faces, each face being a geometric shape with a predetermined number of vertices, the face vertices being ones of the data points from the ordered list, the boundary connection between any two adjacent vertices of a face comprising an edge of the face, with a face being connected to another adjacent face in the mesh through a shared edge and shared vertices creating that shared edge;

(c) means for access a data point using the ordered list the accessing means yielding the next data point for insertion into the mesh following the sequence of points in the ordered list;

(d) means for insert the next data point for insertion, by taking predetermined reorganizing steps to connect the data point for insertion into the mesh and advance the pointer to the next data point on the ordered list;

(e) means for check whether the construction of newly created faces as a result of data point insertion, meets a predetermined optimality criteria;

(f) means for redefine in a sequenced order the boundaries of the newly created faces when one of the newly created faces does not meet the predetermined optimality criteria, and place an indication on a history list in sequence for each redefinition made for a particular face.

9. A computer based system for checking optimality, based on Delaunayian principles, of data points being inserted into a triangulated 3D mesh model, the computer including a processor coupled to a memory, configured to accept as input a plurality of data points, with each data point being a coordinate describing the object or surface to be modeled, the data points contained on an ordered list which is the sequential order for insertion of the data points and the computer further configured to construct a 3D mesh to model the object or surface, the system comprising:

(a) a data structure to describe faces of the 3D mesh to include each data point in the 3D mesh as a vertex of at least one triangular face of the triangulated 3D mesh, sequentially order the vertices of each face of the 3D mesh, and describe the relationship of each face being connected to another adjacent, neighboring face through a shared edge and the pair of shared vertices creating that shared edge;

(b) the computer adapted to insert a new data point into the 3D mesh by reorganizing the arrangement of vertices of a face for insertion to create a set of three new faces, each new face having a data structure similar to the existing faces;

(c) the computer further adapted to check the faces of the 3D mesh for Delaunayian optimality;

(d) the computer further adapted to rearrange the 3D mesh if any of the faces do not pass the Delaunayian optimality check; and (e) the computer further adapted to continue checking all the faces affected by the input of the new data point, the check to proceed in an order determined by the ordering of the vertices in the face data structure.

10. A computer based system for checking optimality, based on Delaunayian principles, of data points being inserted into a triangulated 3D mesh model, the computer including a processor coupled to a memory, configured to accept as input a plurality of data points, with each data point being a coordinate describing the object or surface to be modeled, the data points contained on an ordered list which is the sequential order for insertion of the data points and the computer further configured to construct a mesh to model the object or surface, the system comprising:

(a) a data structure to describe the mesh faces such that each data point in the mesh is a vertex of at least one triangular face of the mesh, each face of the mesh has its vertices ordered sequentially to have first, second and third vertices with a boundary connection between any two adjacent vertices of a face comprising an edge of the face and any face being connected to another adjacent, neighboring face through a shared edge and the pair of shared vertices creating that shared edge, the neighbors of the face being ordered following the sequential order corresponding to the ordering of the face's vertices with a first neighbor face, second neighbor face and third neighbor face;

(b) the computer adapted to insert a new data point in the order indicated on the ordered list, into an existing face and alter the data structure such that the existing face is reorganized to create a set of three new faces, each having the new data point as one vertex and the remaining two vertices being vertices of the existing face, the vertices of the new faces being ordered in a sequence consistent with the existing face's vertices, where the new data point is the first ordered vertex in each of the three new faces, and the neighbors of the new faces being ordered following a predetermined sequential order corresponding to the ordering of the new face's vertices;

(c) the computer further adapted to begin a checking one of the new faces created by the insertion of the new data point for Delaunayian optimality;

(d) the computer further adapted to reorient the vertices of the first neighbor face in the data structure, if the combination does not pass Delaunayian optimality, so that the vertices of the first neighbor are ordered such that the first vertex is opposite the face being checked;

(e) the computer further adapted to rearrange the shared edge between the face being checked and the first neighbor, if the combination does not pass Delaunayian optimality, the rearrangement occurring by redefinition in the data structure of the vertices for the first neighbor face by setting the first vertex to be the first vertex of the face being checked, setting the second vertex to be the first neighbor's former first vertex and setting the third vertex to be the first neighbor's former second vertex and redefining in the data structure the vertices of the face being checked to change its third vertex to be the former first vertex of the first neighbor;

(f) the computer further adapted to redefine the neighbors of the rearranged faces in the data structure based on the new ordering of the vertices; and (g) the computer further adapted to recheck the face previously being checked if it was rearranged, the checking on the face proceeding until it passes the Delaunayian optimality criteria.

11. The system of claim 10 further comprising the computer adapted to proceed, after completing a Delaunayian optimality check on a face, to the first neighbor of the face and perform a Delaunayian optimality check on the first neighbor, the computer proceeding thereafter to each succeeding first neighbor face and performing a Delaunayian optimality check at each said face until it arrives at the first face checked.

12. The system of claim 10 further comprising the computer adapted to project the 3D mesh model onto a 2D reference object creating a 2D triangulated mesh on the reference object that is representative of the original 3D mesh model, and performing the checking on the 2D projected mesh.

13. The system of claim 10 where the reorientation of the first neighbor's vertices is accomplished by assigning the values 0,1,2 to the first, second and third vertices and neighbors respectively, storing a variable (k) equal to the neighbor value of the face being checked in the data structure of the first neighbor face, the first neighbor's vertices are redefined such that the vertex k value is assigned to the original vertex (3−k), the original vertex (3−k) value is assigned to the original vertex with value 0, and the value 0 is assigned to the original vertex k, resulting in a reorientation of the first neighbor vertices such that the vertex assigned value 0 is the first vertex, the vertex assigned value 1 is the second vertex, and vertex assigned value 2 is the third vertex.

14. A computer-based system for ordering a plurality of data points to be inserted into a mesh model of an object or surface comprised of geometric faces, the computer comprising a processor to manipulate the order of the data points and a memory to store the order of the data points, each data point being a coordinate describing the object or surface to be modeled, the system comprising:

(a) the computer adapted to recursively subdivide the plurality of data points into partitions until a single data point is contained in each partition;

(b) the computer further adapted to sequentially order the partitions as the recursive subdivision is occurring;

(c) the computer further adapted to sequentially order the data points corresponding to the ordering of the partition in which the data point is in and storing this sequential order of data points in an ordered list.

15. A computer-based system for ordering a plurality of data points to be inserted into a mesh model of an object or surface comprised of geometric faces, the computer comprising a processor to manipulate the order of the data points and a memory to store the order of the data points, each data point being a coordinate describing the object or surface to be modeled, the system comprising:

(a) a distance computing element to determine the larger extent in two dimensions of the plurality of data points;

(b) a partitioning element to partition the plurality of date points along the larger extent into three boxes, with each box containing approximately the same number of points;

(c) an ordering element to order the boxes as a first, second and third box along the larger extent, and order the data points in the boxes such that all data points in the first box are before all the data points in the second box, and all data points in the second box are before all the data points in the third box;

(d) the partitioning element further adapted to continue partitioning each box along its larger extent into three boxes, until each box contains a single data point;

(e) the ordering element further adapted to order the newly created boxes as a new first, new second and new third box for each original box along the larger extent, such that the new boxes created from the original second box are ordered in the opposite direction of the new boxes created from the original first and third boxes and order the data points in each of the new boxes such that all data points in the new first box are before all the data points in the new second box, and all data points in the new second box are before all the data points in the new third box; and (f) the ordering element further adapted to store the order of the data points in an ordered list corresponding to the order determined when each partitioned box contains a single data point.

16. A method for generation of an optimized mesh model of a three-dimensional object or surface on a computer, the computer, including a processor coupled to a memory and program elements, adapted to accept as input a plurality of data points, with each data point being a coordinate describing the object or surface to be modeled, and construct a 3D mesh to model the object or surface, the method comprising the steps of:

(a) ordering the plurality of data points into a sequence from first point to last point for insertion into the 3D mesh model and storing the sequence of data points in an ordered list;

(b) constructing a 3D mesh following the ordered list, the 3D mesh comprising a plurality of faces, with each face being a geometric shape with a predetermined number of vertices, the face vertices being ones of the data points from the ordered list, the boundary connection between any two adjacent vertices of a face comprising an edge of the face, with a face being connected to another adjacent face in the 3D mesh through a shared edge and shared vertices creating that shared edge, a 3D mesh model construction element constructing the 3D mesh by creating an initial mesh with the 3D mesh model comprising of a plurality of faces;

(c) determining whether the construction of newly created faces as a result of construction, meets a predetermined optimality criteria and to redefine in a sequenced order the boundaries of the newly created faces when one of the newly created faces does not meet the predetermined optimality criteria; and (d) placing an indication on a history list in sequence for each check or redefinition made for a particular face.

17. The method of claim 16 comprising the additional step of starting from the first point of the insert list and continues building the mesh with each succeeding point in sequence until last point of the ordered list and the list is followed using a pointer.

18. The method of claim 16 where the optimality criteria is the Delaunay principle of optimality for an irregular triangulated mesh.

19. The method of claim 16 further comprising the further step of inserting data points starting from the first point of the insert list and continuing to building the mesh with each succeeding point in sequence until last point of the ordered list and then regenerating the following the sequence of indications on the history list.

20. A method for generation of an optimized mesh model of a three-dimensional object or surface using a plurality of data points, with each data point being a coordinate describing the object or surface to be modeled, the method comprising the steps of:

(a) ordering the plurality of data points by subdividing the plurality into partitions and continuing to subdivide until each partition contains a single data point and listing the data points in a sequence corresponding to the subdividing to create an ordered list where each point in the list is a near neighbor to the next point in the ordered list;

(b) constructing a mesh comprising at least one face using a subset of the plurality of data points, the mesh comprising a plurality of faces with each face being a geometric shape with a predetermined number of vertices, the face vertices being ones of the subset of data points, the boundary connection between any two adjacent vertices of a face comprising an edge of the face, with a face being connected to another adjacent, neighboring face in the mesh through a shared edge and shared vertices creating that shared edge;

(c) further constructing the mesh by inserting data points and making those insertions in a sequence following the ordered list, the mesh model construction selecting a data point from the ordered list for further building the mesh;

(d) identifying the mesh face which is closest in distance to the data point from the ordered list;

(e) further construct the mesh by inserting the data point into the face identified by the location element, by rearranging the vertices of the face and including the data point for insertion to create a set of new faces with the data point for insertion being shared in each new face, the new faces being connected to other faces in the mesh through vertices and edges as were previously established in the insertion face, establishing neighbor relationships for each new face and advancing the pointer to the next data point in the ordered list;

(f) checking one of the newly created faces to determine whether its construction meets a predetermined optimality criteria by checking the new face and the neighbor face opposite the newly inserted data point to evaluate its vertex and edge configuration for optimality and reconfiguring the face being checked and the neighbor to redefine their boundaries when the newly created face does not meet the predetermined optimality procedure;

(g) placing an indication of either a successful check or the rearrangement on a history list for this check;

(h) checking the all the newly created faces in a rotational direction moving from the location of the first checked face;

(i) placing an indication of either a successful check or the rearrangement on a history list in succession as each subsequent check is executed; and j) constructing the complete mesh inserting all point following the sequence of the ordered list and checking to add indications to the history list, and thereafter regenerating the mesh using only the ordered list to insert points and the indications on the history list to make the data point insertions.

21. A method for generation of an optimized mesh model of a three-dimensional object or surface on a computer, the computer, including a processor coupled to a memory and program elements adapted to accept as input a plurality of data points, with each data point being a coordinate describing the object or surface to be modeled, and construct a mesh to model the object or surface, the method comprising the steps of:

(a) ordering the plurality of data points by recursively subdividing the plurality of data points into partitions until each partition contains a single data point, ordering the partitions during the recursive subdivision, ordering the data points in a sequence corresponding to the order of the partitions containing the data points and storing this sequence of data points in an ordered list;

(b) constructing a mesh comprising of a plurality of triangular faces, the face vertices being ones of the data points from the ordered list, the vertices for each face being ordered sequentially to have first, second and third vertices with a boundary connection between any two adjacent vertices of a face comprising an edge of the face, with a face being connected to another adjacent, neighboring face in the mesh through a shared edge and shared vertices creating that shared edge, the neighbors of the face being ordered following a sequential order corresponding to the ordering of the face's vertices;

(c) placing a pointer to the data point on the ordered list that is next in sequence after the last data point used to construct a face, the pointer indicating the next data point for insertion into the mesh;

(d) determining the mesh face which is closest in distance to the next data point for insertion;

(e) inserting the next data point for insertion into the mesh by incorporating the data point for insertion and reorganizing the arrangement of vertices of the face that is closest in distance to the point for insertion (the insertion face) to create a set of three new triangles, each having its vertices ordered in a sequential manner with the data point for insertion being the first point in each new triangular face, the new triangles being connected to other triangles in the mesh through vertices and edges as were previously established in the insertion face, the new faces creating a continuous surface with the other faces of the mesh, the neighbors for each new face being ordered following the sequential order and corresponding to ordering of the face's vertices;

(f) checking one of the newly created faces to determine whether their construction meets Delaunayian optimality criteria, by checking the newly created face with a neighbor triangle to determine whether the non-shared vertex of the neighbor lies within a circumcircle determined by the vertices of the newly created triangle and place an indication on a history list if the faces meet the Delaunayian optimality criteria;

(g) reconfiguring the shared edge between the triangle being checked and the neighbor to create two new flipped triangles, if the combination does not pass Delaunayian optimality and placing an indication of the flip on the history list as the next action;

(h) rechecking the triangle previously being checked if it was rearranged, using the rearrangement element to flip and indicate the flip history, if the new configuration does not meet Delaunayian optimality;

(i) proceeding to a neighbor of the triangle being checked according to a preselected sequence and perform a check for optimality;

(j) checking the first neighbor of all checked triangles until arriving again to the first triangle checked;

(k) reconstructing the complete mesh, after the complete mesh has been constructed, using only the ordered list to insert points and the associated operations stored in the history list for each data point insertion.

* * * * *